US007010570B1

(12) United States Patent
Boies et al.

(10) Patent No.: US 7,010,570 B1
(45) Date of Patent: Mar. 7, 2006

(54) SYSTEM AND METHOD FOR THE CONTROLLED PROGRESSIVE DISCLOSURE OF INFORMATION

(75) Inventors: Stephen J. Boies, Mahopac, NY (US); Samuel Dinkin, Austin, TX (US); Paul Andrew Moskowitz, Yorktown Heights, NY (US); Philip Shi-Lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 1081 days.

(21) Appl. No.: 09/688,354

(22) Filed: Oct. 16, 2000

(51) Int. Cl.
    G06F 15/13 (2006.01)

(52) U.S. Cl. .......................... 709/205; 709/207; 705/1; 705/26

(58) Field of Classification Search ................ 709/217, 709/205, 207; 705/1, 26; 379/196; 707/104.1, 707/3, 10
    See application file for complete search history.

(56) References Cited

U.S. PATENT DOCUMENTS

| | | | | |
|---|---|---|---|---|
| 5,884,272 | A * | 3/1999 | Walker et al. .................. | 705/1 |
| 6,342,906 | B1 * | 1/2002 | Kumar et al. ................ | 715/751 |
| 6,480,885 | B1 * | 11/2002 | Olivier ........................ | 709/207 |
| 6,532,488 | B1 * | 3/2003 | Ciarlante et al. ........... | 709/205 |
| 6,574,608 | B1 * | 6/2003 | Dahod et al. ................. | 705/26 |
| 6,594,633 | B1 * | 7/2003 | Broerman ...................... | 705/1 |
| 6,618,593 | B1 * | 9/2003 | Drutman et al. ......... | 455/456.3 |
| 6,662,194 | B1 * | 12/2003 | Joao ........................ | 707/104.1 |
| 6,665,389 | B1 * | 12/2003 | Haste, III ................... | 379/196 |

OTHER PUBLICATIONS

Book by Richard E. Smith, "*Internet Cyptography*", publ. by Addison-Wesley, 1997.

(Continued)

*Primary Examiner*—Viet D. Vu
*Assistant Examiner*—Jinsong Hu
(74) *Attorney, Agent, or Firm*—Buckley, Maschoff & Talwalkar LLC; Stephen C. Kaufman

(57) ABSTRACT

A system and method of operating a computer network implementing progressive information disclosure is provided. The system and method comprises receiving electronically from a first user a plurality of levels of information, the information levels to be presented in a sequence, then receiving electronically a request from a second user for information provided by the first user, and transmitting electronically the plurality of information levels in sequence to the second user until a termination response is received or until the information sequence has completed. Alternatively, a system and method of progressive information disclosure is provided comprising receiving from a first information providing user a plurality of levels of information, the information levels to be presented in a sequence, receiving from a second information providing user a plurality of levels of information, the information levels to be presented in a sequence, receiving a request from the second user for information provided by the first user, setting a time for the second user to receive the first user information, transmitting the first user information level to the second user simultaneous to transmitting the second user information level to the first user, receiving a response to terminate information disclosure from either the first user or the second user, and terminating information disclosure to the first user and to the second user simultaneously. Alternatively, the system and method can include a step of verifying the information provided by either user before transmitting such information to the other user.

6 Claims, 27 Drawing Sheets

OTHER PUBLICATIONS

Book by James D. Murray et al., "*Graphics File Formats*", 2nd Edition, publ. by O'Reilly & Associates, 1996.
Book by Scott Roberts, "*Programming Microsoft Internet Explorer 5*", Microsoft Press, 1999.
Book by Simon North and Paul Hermans, "*Teach Yourself XML in 21 Days*", Macmillan Computer Publishing, 1999.
Book by Hiroshi Maruyama, Kent Tamura, Naohiko Uramoto, "*XML and Java: Developing Web Applications*", Addison-Wesley Pub. Co., 1999.
Book by Ed Roman, "*Mastering Enterprise Java Beans*", publ. by John Wiley and Sons, 1999.
Book by Matthew Reynolds, "*Beginning E-Commerce*", Wrox Press Inc., 2000.
Book by Duane K. Fields, "*Web Development with Java Server Pages*", publ. by Manning Publications Co., 2000.
Web site, //www.xml.org/—The XML Industry Portal, no date.
Web site, //www.w3.org/—The World Wide Web Consortium, no date.
Web site, //www.w3.org/XML/—Extensible Markup Language (XML), no date.
Web site, //www.w3.org/TR/REC-DOM-Level-1/— Document Object Model (DOM) Level 1 Specification, no date.
Web site, //member.aol.com/royalef/gifabout.htm—Royal Frazier'GIF Animation on WWW, no date.

\* cited by examiner

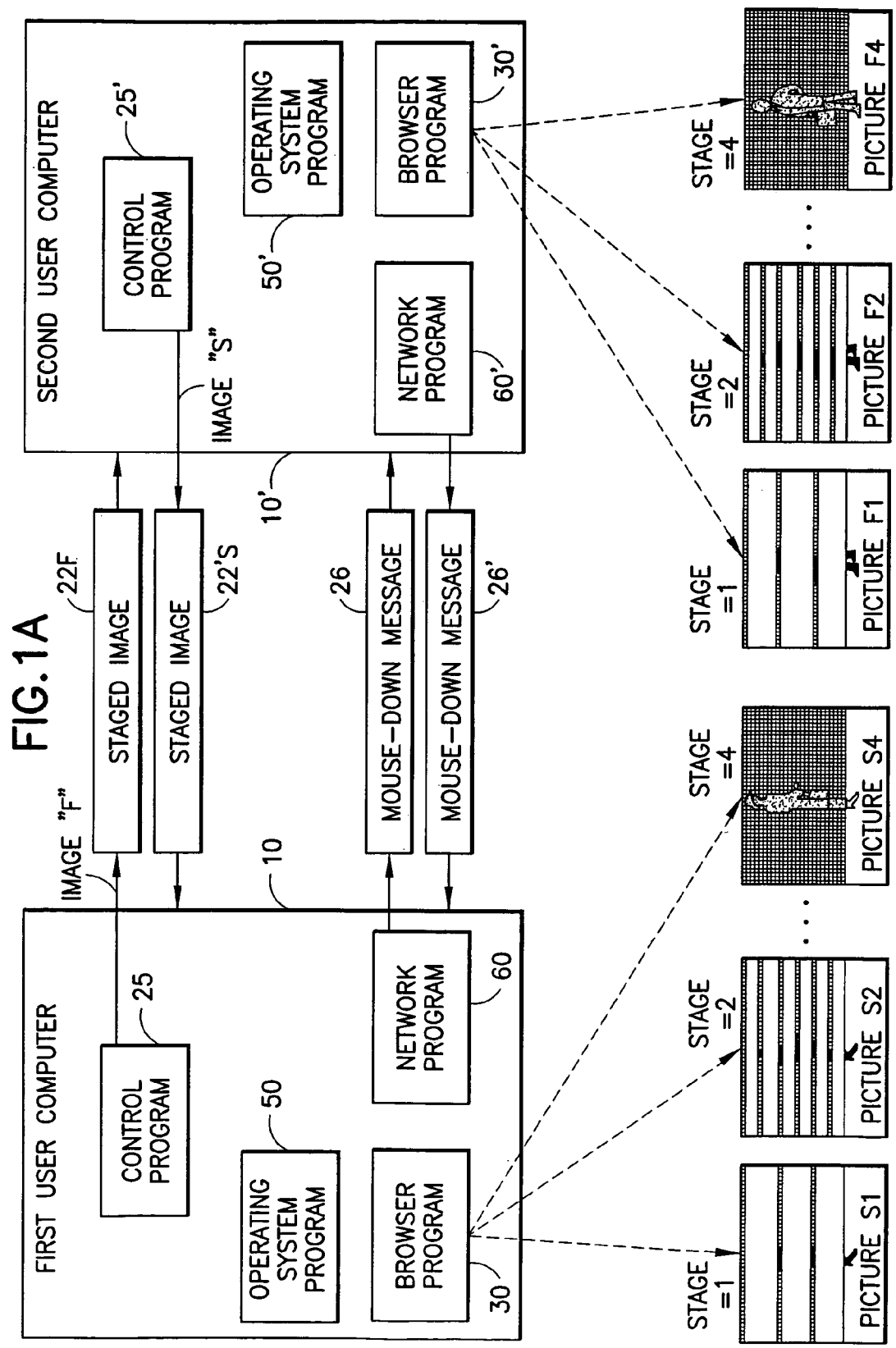

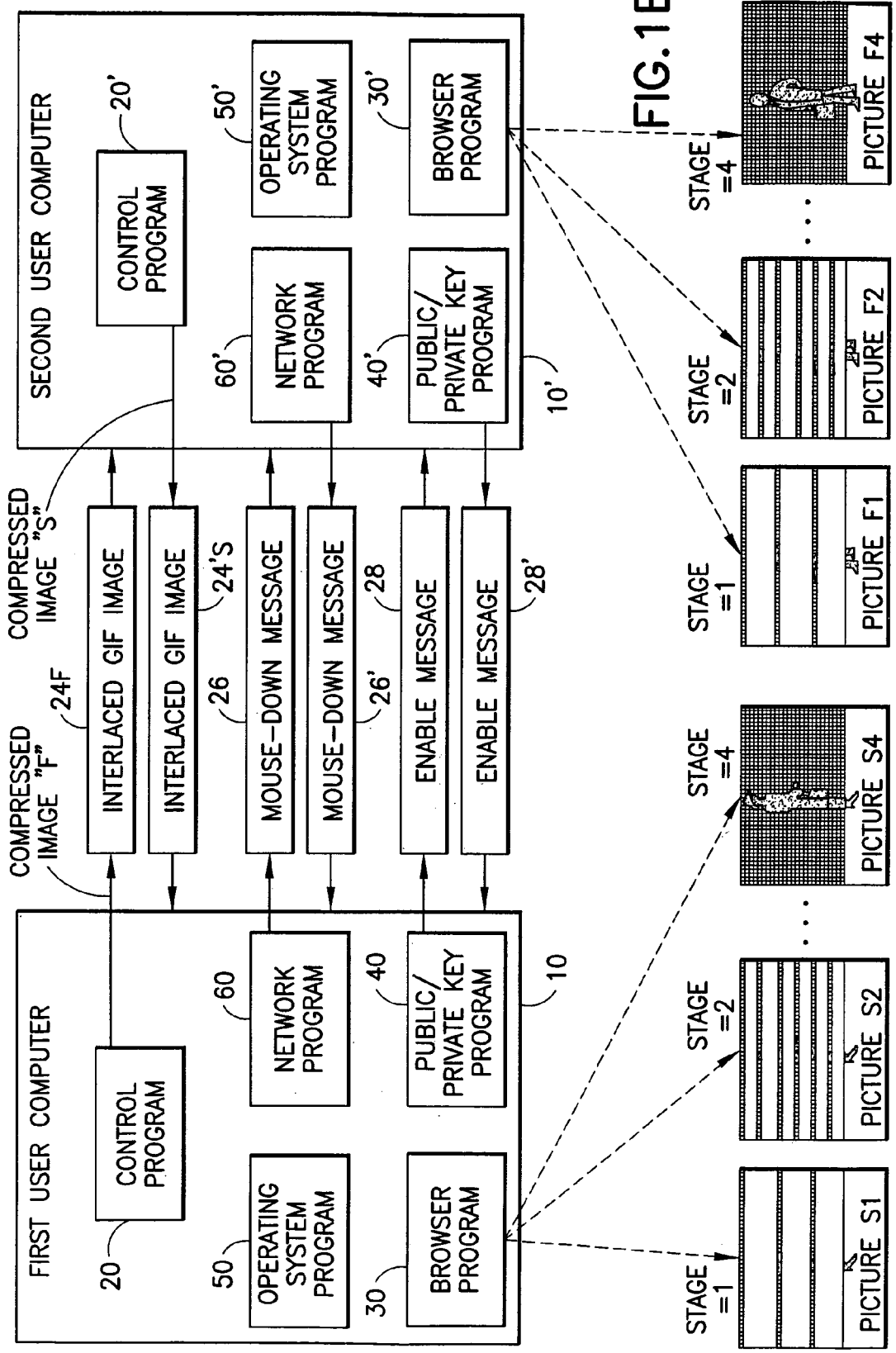

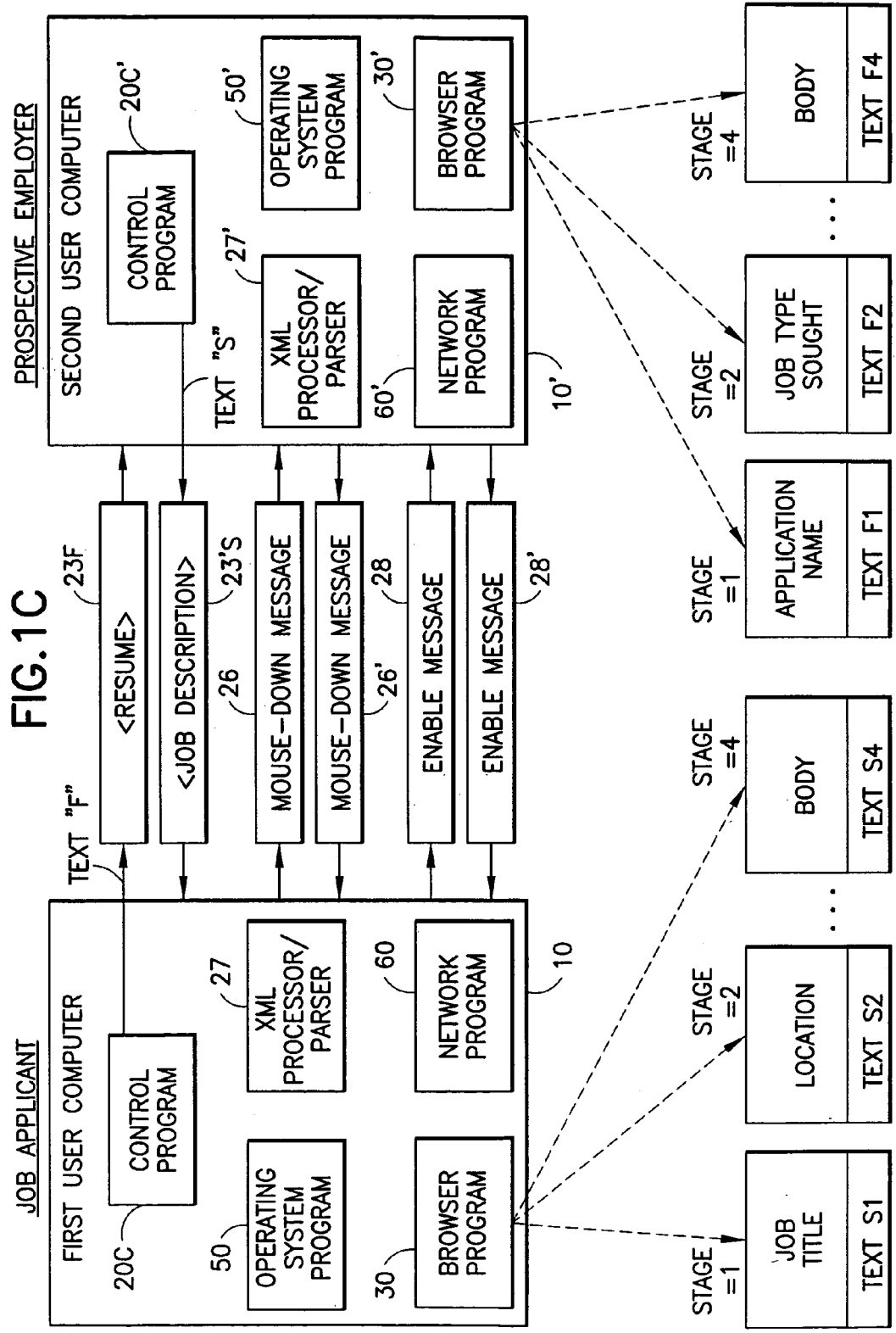

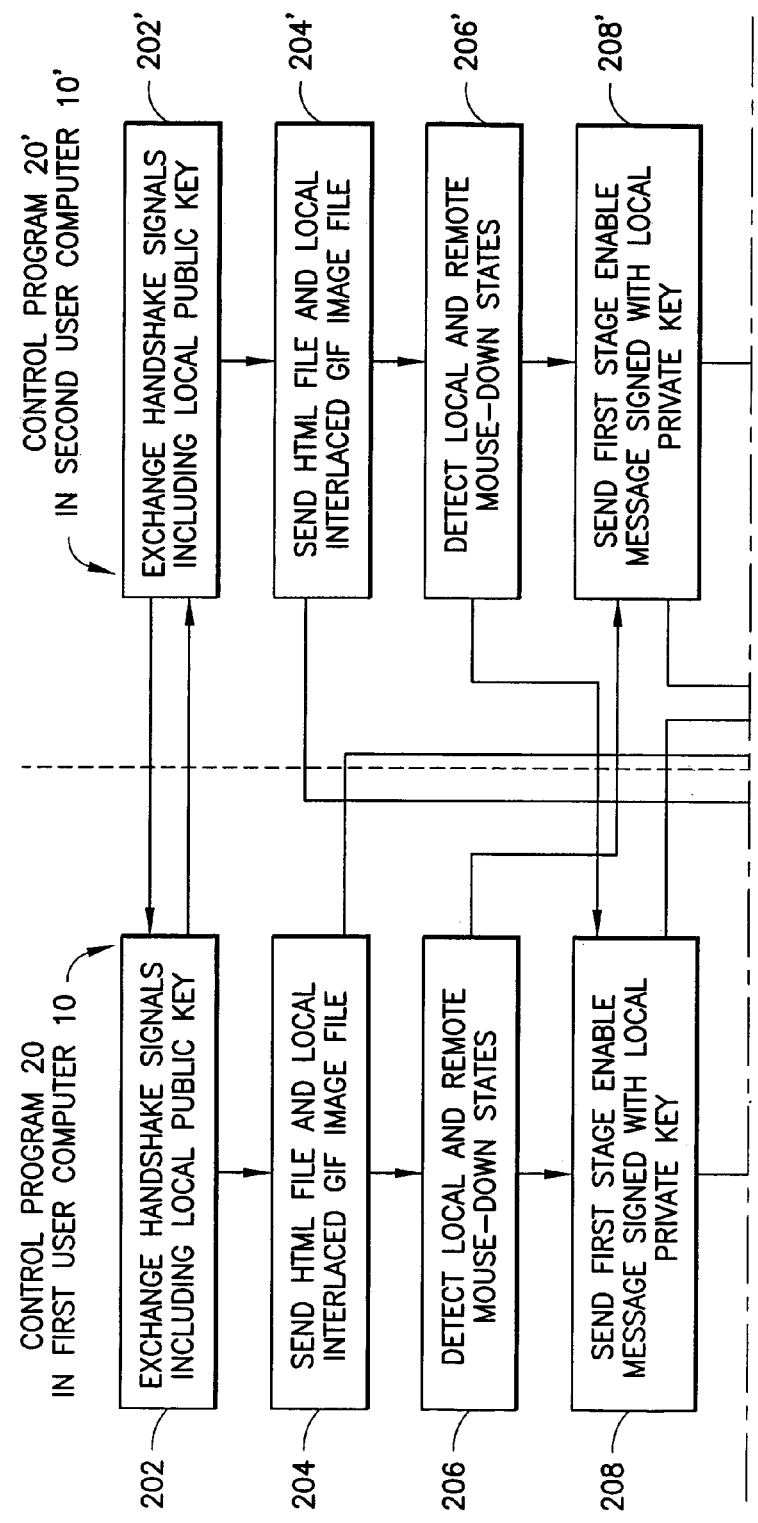

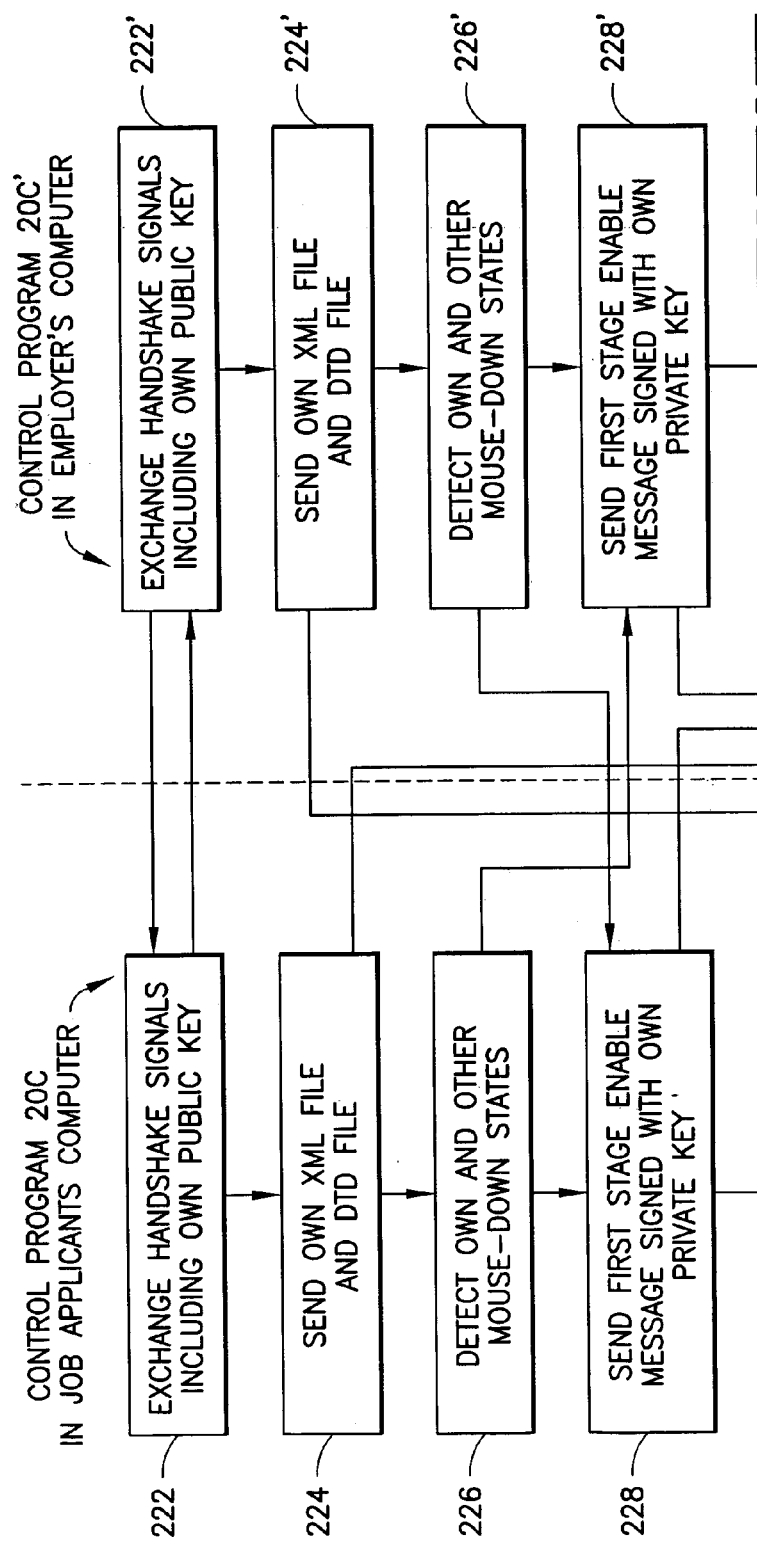

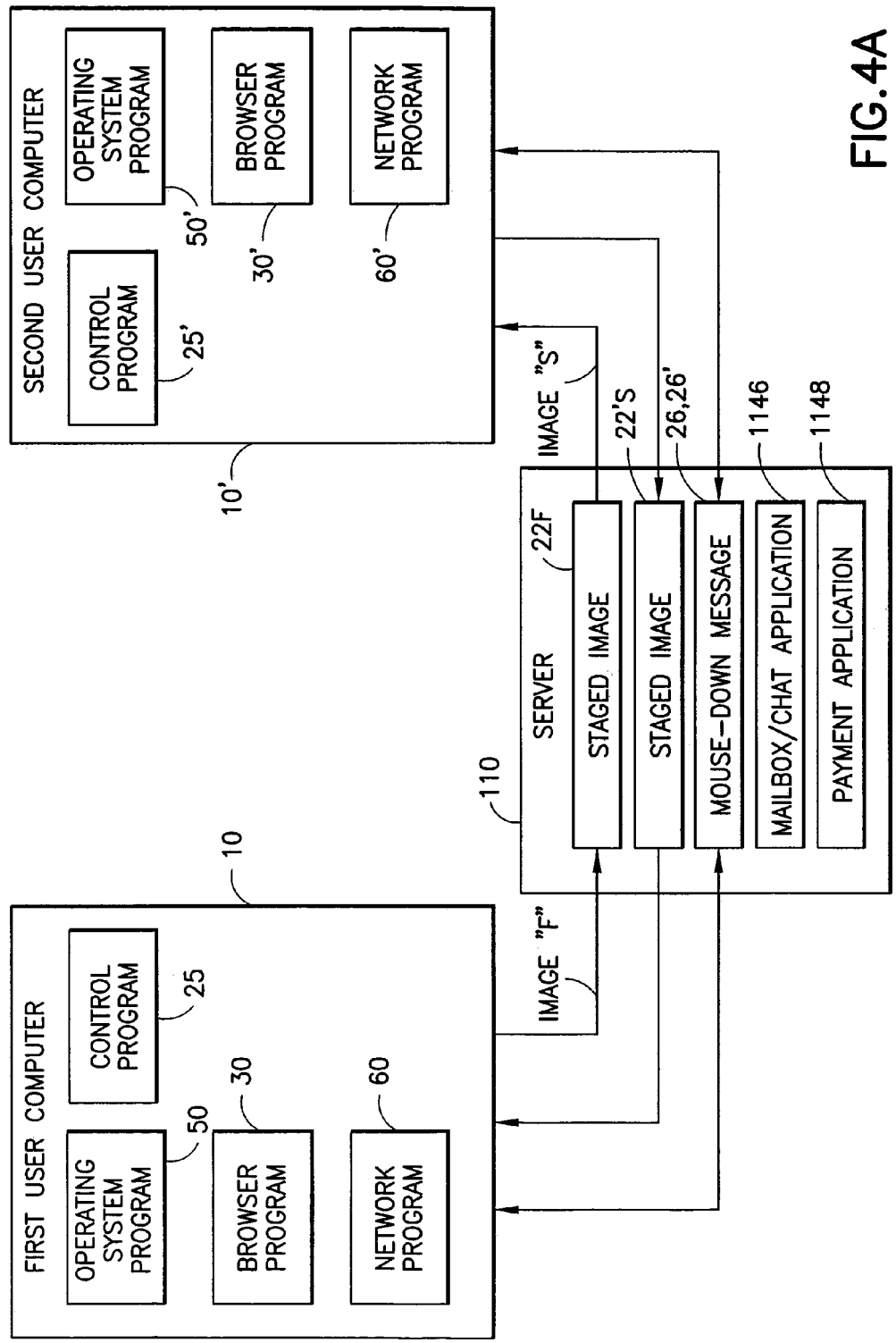

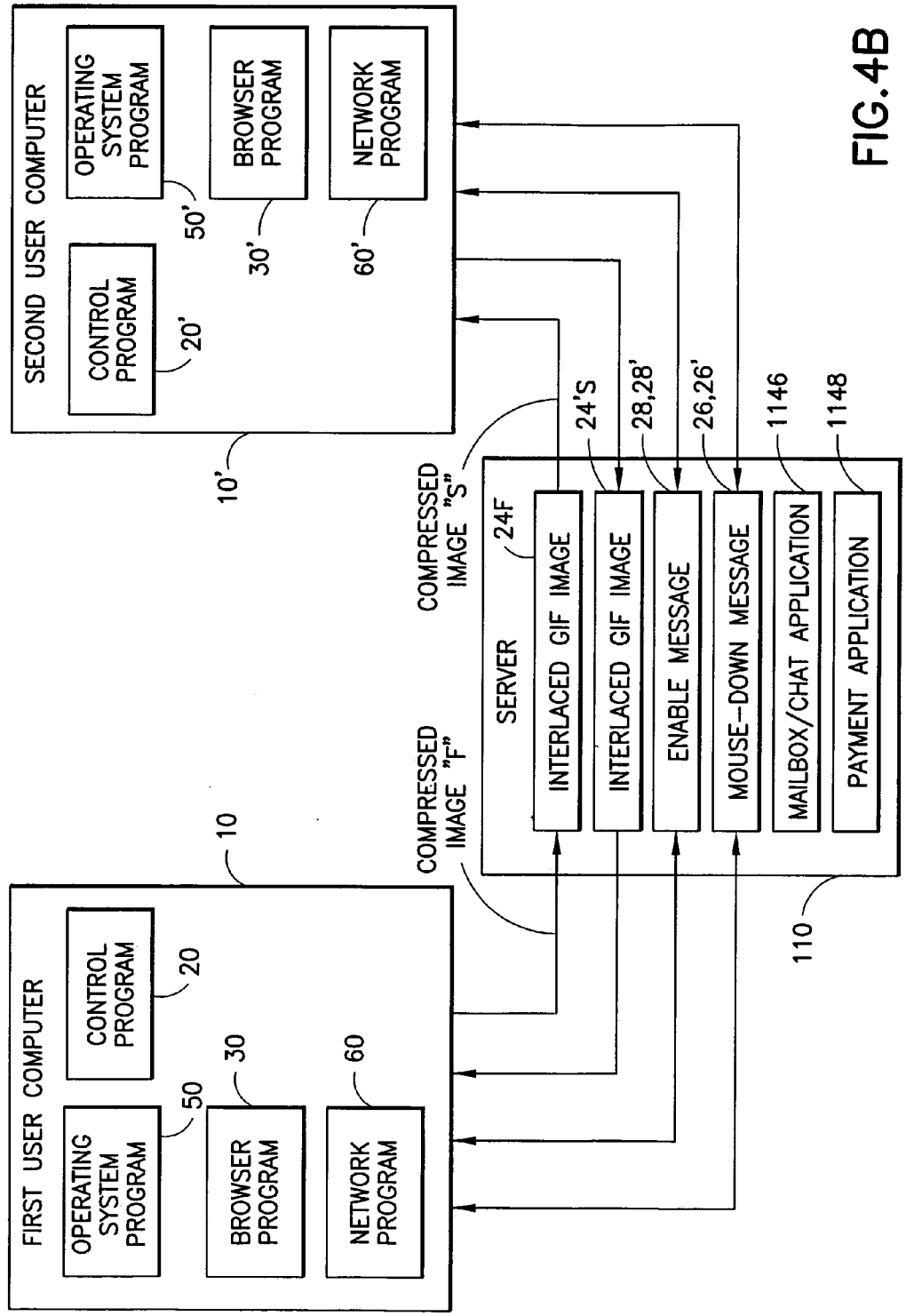

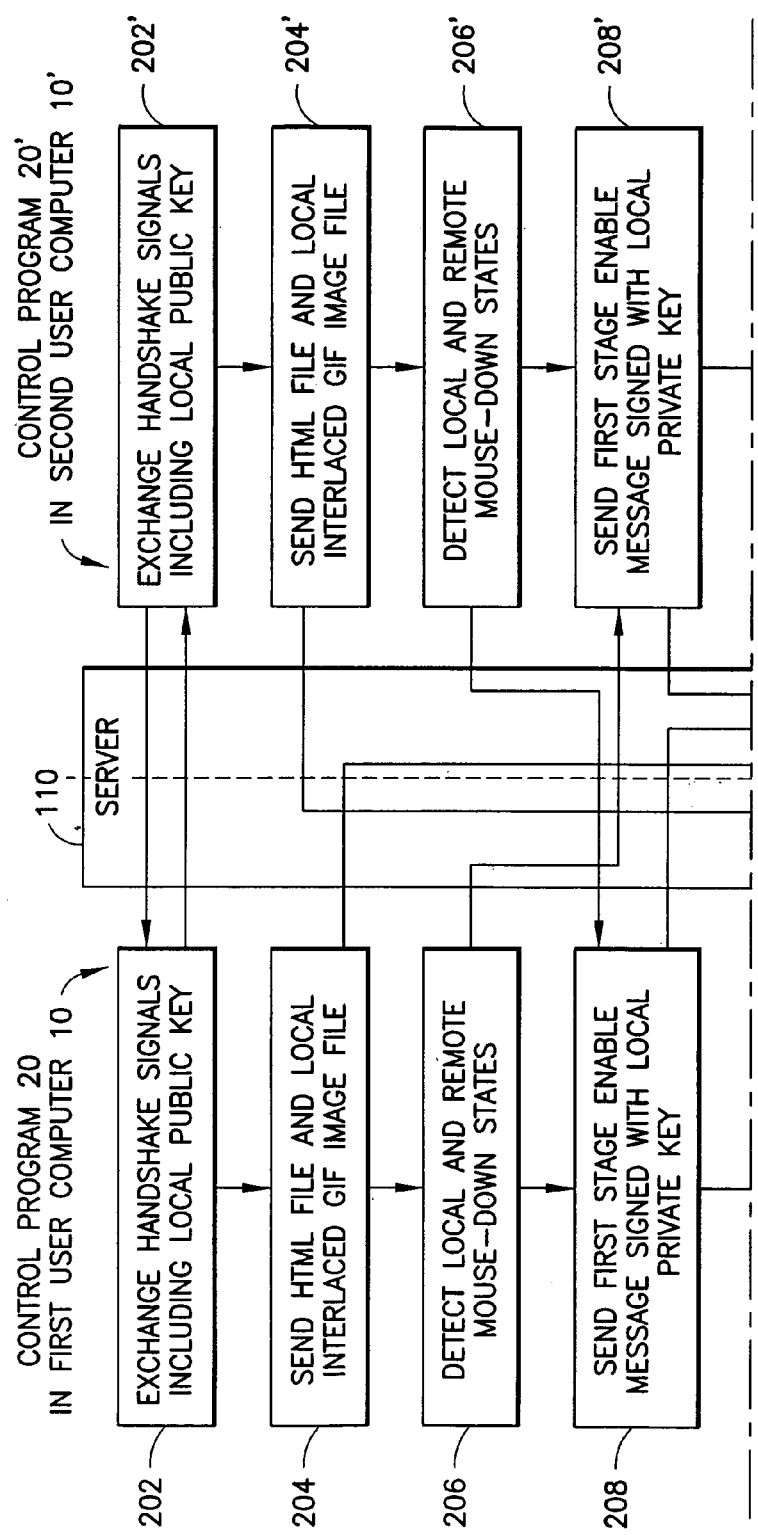

| USER NAME CONTACT INFORMATION | CATEGORY | FIRST LEVEL OF INFORMATION | SECOND LEVEL OF INFORMATION | THIRD LEVEL OF INFORMATION | FOURTH LEVEL OF INFORMATION |
|---|---|---|---|---|---|
| J. Smith jsmith@eros.com | DATING | 25 YEARS OLD | 6 FEET TALL | LIKES SPORTS | LIVES IN NEW YORK CITY |
| F. Jones fjones@msn.com | JOB SEEKER | ELECTRICAL ENGINEER | 2 YEARS DESIGN EXPERIENCE | WILL TRAVEL | LARGE SIZED COMPANY |
| ... | ... | ... | ... | ... | ... |

FIRST USER COMPUTER DATABASE, 800

FIG.8

SECOND USER COMPUTER DATABASE, 900

| USER NAME CONTACT INFORMATION 901 | CATEGORY 902 | FIRST LEVEL OF INFORMATION 903 | SECOND LEVEL OF INFORMATION 904 | THIRD LEVEL OF INFORMATION 905 | FOURTH LEVEL OF INFORMATION 906 |
|---|---|---|---|---|---|
| S. MAXWELL | DATING | 20-30 YEARS OLD | 5' 7" TALL | INTERESTED IN BIKING, TENNIS, AND READING | LIVES IN WESTCHESTER COUNTY, NY |
| E. Co. | EMPLOYER | DESIGN ENGINEER | 1 YEAR OF EXPERIENCE | JOB REQUIRES TRAVEL | START-UP COMPANY |
| ... | ... | ... | ... | ... | ... |

FIG.9

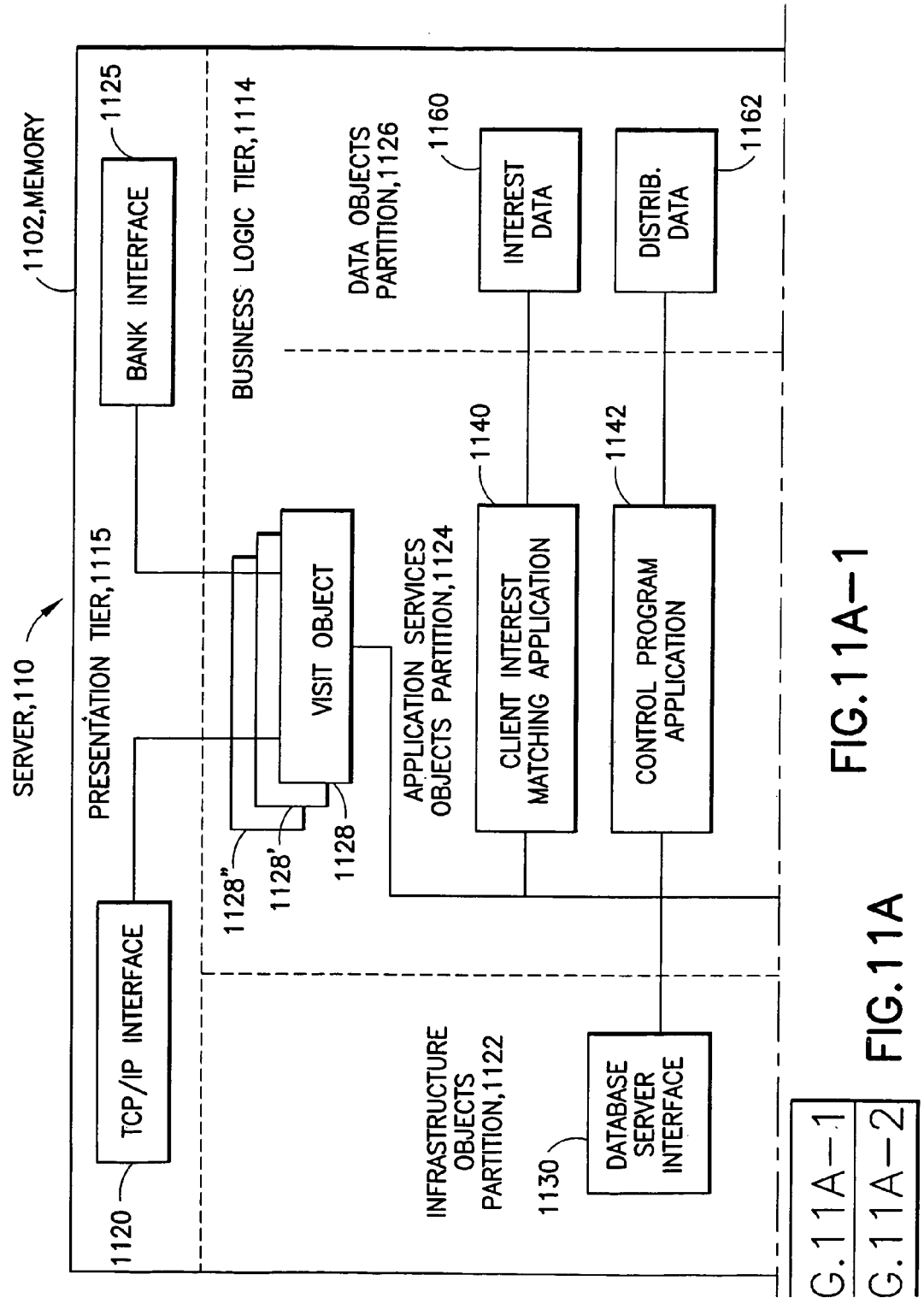

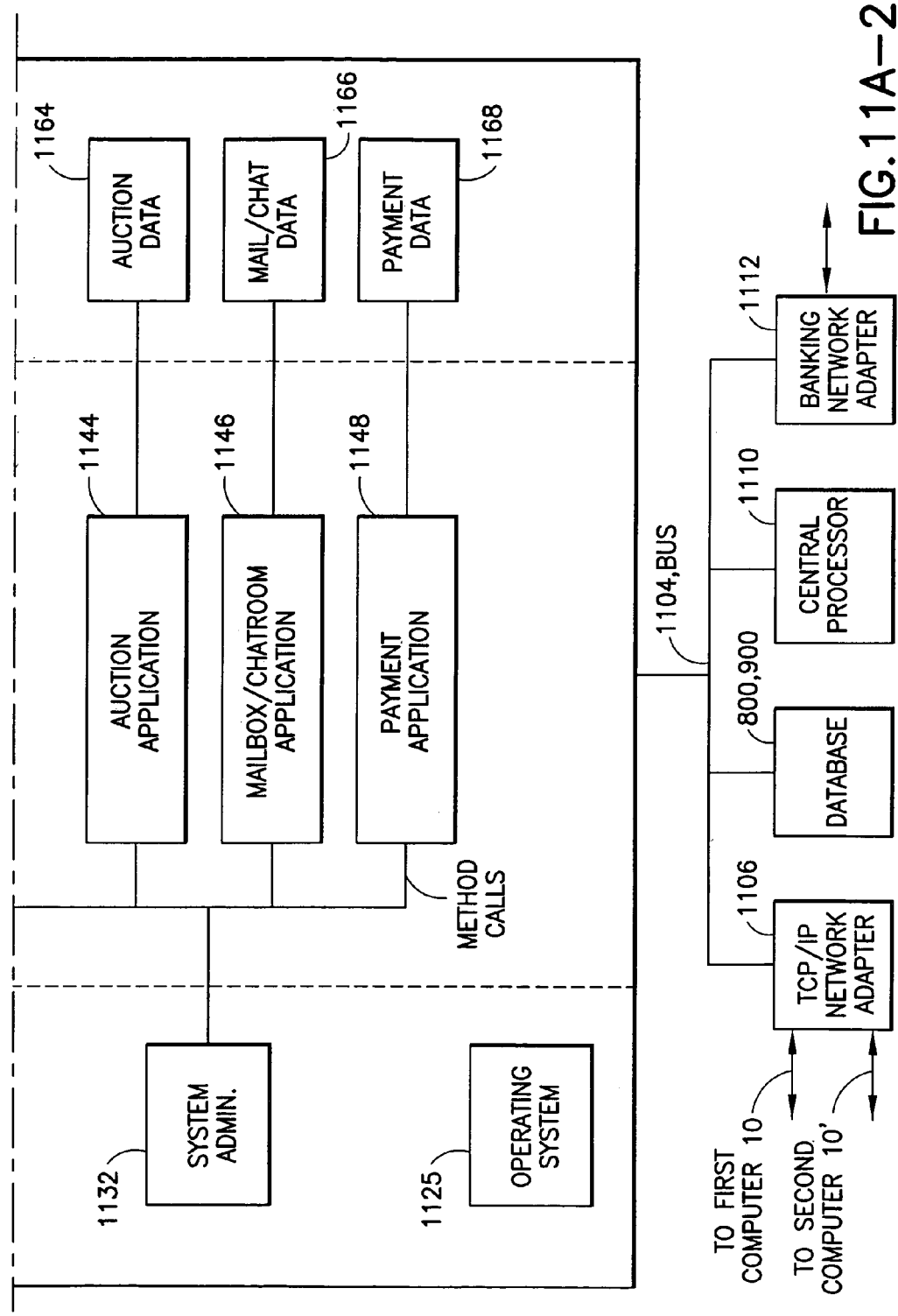

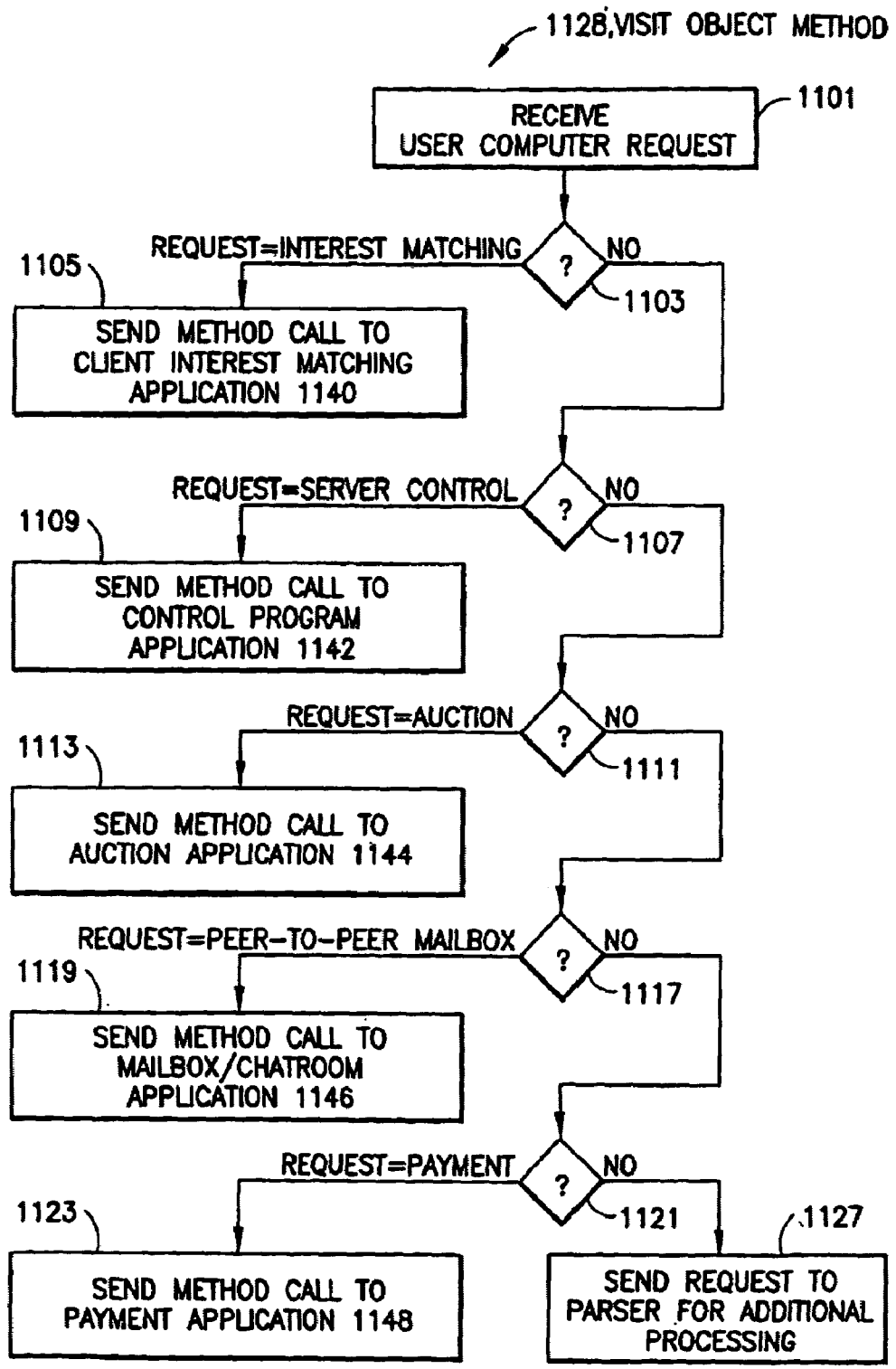
Fig. 11-B

SYSTEM AND METHOD FOR THE CONTROLLED PROGRESSIVE DISCLOSURE OF INFORMATION

FIELD OF THE INVENTION

This invention relates generally to controlled information disclosure and, more particularly, to a system and method for the controlled disclosure of information between at least two interested users.

BACKGROUND

Since information is increasingly being exchanged through the use of computers, the confidentiality of information disclosed is of increasing concern to both individuals and corporations. An individual or corporation may desire to restrict disclosure of personal or confidential information to certain persons. For example, an individual may desire to control disclosure of dating information, through a dating service or otherwise, only to other individuals with similar interests. A corporation may desire to control disclosure of information on an open employment position only to qualified applicants.

A traditional dating service operates by collecting information from a group of persons, storing such information, and then making such information available for retrieval by a person interested in dating. This process normally involves a person submitting personal information, in the form of questionnaire answers, videotapes of an individuals interests, or the like. A person interested in dating then reviews the stored information and selects a person based upon the information reviewed. This process is not interactive since the information is available only after the initial collection by the dating service.

Similarly, in an employment scenario, information on open employment positions of an employer is stored with a job data bank or the like. A prospective employee then searches through the information and sends a resume to the employer. If the employer is interested in the prospective employee, an interview is set and the job process continues. The employer may not desire disclosure of certain information until they have reviewed qualified prospective employees. As in the dating scenario described above, this employment process is not interactive since information is available only after initial disclosure by the employer.

SUMMARY

A system and method for the progressive disclosure of information allows information to be disclosed at the rate and in the manner of the respective levels of interest expressed by both users. The system and method involves transfer of information between a first user and a second user. The preferred embodiment involves instantaneous disclosure of information to both the first and second users simultaneously. A time for the users to meet online and progressively disclose information is established by a server or as agreed upon by the users. Alternatively, with the increasing use of chat rooms by individuals online, the time to meet online can be arranged when both users are in a chat room. Information disclosure to users is initiated at the designated time and continues until a termination response is received by either user to cease disclosure. Upon receiving such termination response, information disclosure to both users is simultaneously terminated.

The system and method also provides for operating a computer network implementing progressive information disclosure comprised of receiving electronically from a first user levels of information, the information levels to be presented in a sequence, then receiving electronically a request from a second user for information provided by the first user, and transmitting electronically the plurality of information levels in sequence to the second user until a termination response is received or until the information sequence has completed.

The system and method of progressive disclosure of information can also be applied to peer to peer computer arrangements. Information can be in the form of text, images, audio clips, video clips, and the like.

The invention can also be applied to the exchange of compressed information files, such as a compressed image file that has an interlaced format that can be progressively decoded by the recipient, as long as both the sender and the recipient agree to continue.

BRIEF DESCRIPTION OF THE DRAWINGS

FIG. 1A illustrates a first embodiment of a peer to peer arrangement between a first user computer and a second user computer for the sequential transmission of a plurality of pictures having progressively greater resolution.

FIG. 1B illustrates a second embodiment of a peer to peer arrangement, wherein a single compressed image file is exchanged between the first and second computers which has an interlaced format for the decoding of progressively greater resolution pictures at the recipient computer.

FIG. 1C illustrates a third embodiment of a peer to peer arrangement for the exchange of progressively greater detail for text, audio, video, and other media.

FIGS. 2B-1 and 2B-2 are network sequence diagrams for the second embodiment of FIG. 1B.

FIGS. 2C-1 and 2C-2 are network sequence diagrams for the third embodiment of FIG. 1C.

FIGS. 3B-1 and 3B-2 are functional block diagrams of the browser in the second embodiment, where a compressed image file of interlaced format is decompressed, thereby progressively producing images received from the second computer.

FIG. 4A is a network diagram illustrating the relationship between the first user computer, the second user computer, and a server.

FIG. 4B is a network diagram for the second embodiment.

FIGS. 5B-1 and 5B-2 are network sequence diagrams for the network shown in FIG. 4B.

FIGS. 8 and 9 are representative databases maintained by the server.

FIGS. 11A-1 and 11A-2 are functional block diagrams of the server 110 corresponding to the server process shown in the flow diagram of FIG. 10.

FIG. 11B is a flow diagram allocating a given request to the server and to the proper server application program.

DETAILED DESCRIPTION OF THE PREFERRED EMBODIMENTS

Figure 2A:
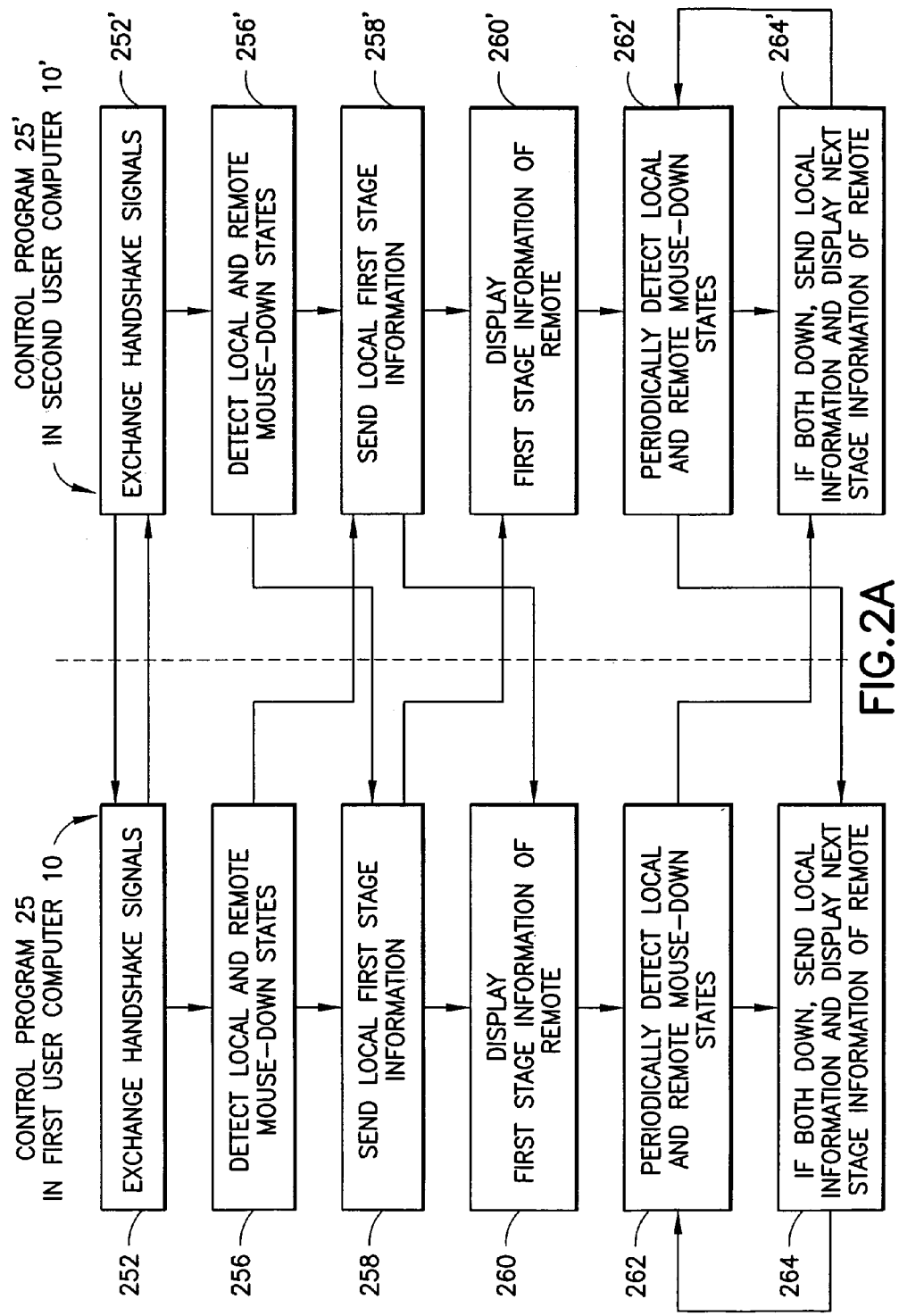
FIG. 2A is a network sequence diagram consisting of a flow diagram for a first user computer and a flow diagram for a second user computer, illustrating the operational interaction of the first and second computers in the first embodiment of FIG. 1A.

FIG. 1A shows the network diagram for the first embodiment, wherein the first user computer 10 is connected in a peer to peer relationship with a second user computer 10' over a network such as a local area network or a wide area network or the Internet. The first user computer 10 includes a control program 25, which is shown in greater detail in FIG. 2A, a browser program 30, an operating system program 50, and a network program 60. The second user computer 10' includes a control program 25' also shown in FIG. 2A, a browser program 30', an operating system program 50', and a network program 60'.

Referring to FIG. 2A, the control program 25 of the first user computer 10 begins in step 252 with an exchange of hand shake signals with the second user computer 10' in step 252' of the control program 25'. The hand shake signals can include an exchange of information about buffer sizes, session start times, and other information necessary to establish a peer to peer communication session between the first computer 10 and the second computer 10'. The first control program 25 then flows to the second step 256 to detect the mouse down states for both the local computer 10 and the remote second computer 10'. Each computer 10 and 10' includes an activation device, such as a mouse-pointing device which has a button, which is activated by the user to indicate a selection. Alternately, a one or more keys on a keyboard connected to the respective computer 10 or 10' can be pressed by the user. The purpose of the activation or mouse down state is to indicate the continued interest on the part of the user in observing the progressive display of pictures transmitted from the other computer. (Such activation state can be detected as a mouse down state wherein a button of the mouse is depressed while interest in continued information disclosure exists, and wherein the button is released when interest in continued information disclosure terminates.) Step 256' in the control program 25' performs a similar activation state detection for both the computer 10' and the computer 10. As long as the activation states are simultaneously in existence for both the computer 10 and the computer 10', then steps 256 and 256' are satisfied. Step 256 then flows to step 258 where a first stage information, such as the low resolution picture, F1, is sent from the computer 10 to the computer 10'. Correspondingly, step 256' flows to step 258' in the control program 25', to send the first stage information, such as the low-resolution picture, S1, from the computer 10' to the computer 10.

Figure 3A:
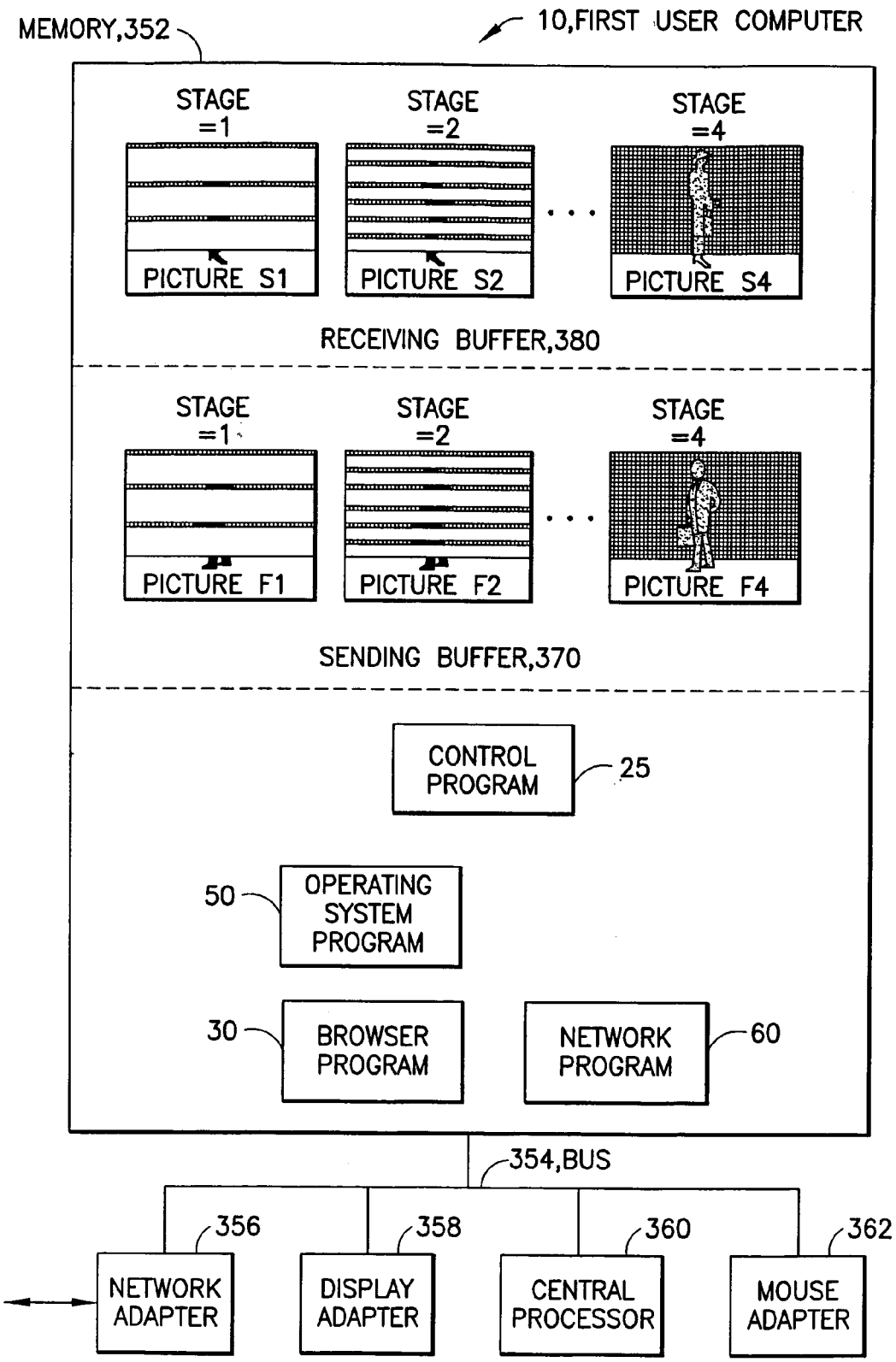
FIG. 3A is a functional block diagram of the first user computer, illustrating the sending buffer with a fixed set of images to be transmitted and a receiving buffer with a fixed set of images which are received.

Reference is now made to the functional block diagram of FIG. 3A, which shows the first user computer 10. First computer 10 includes a memory 352 connected by a bus 354 to a network adapter 356, a display adapter 358, a central processor 360, and a mouse adapter 362. The network adapter 356 is connected over the peer to peer network to the second computer 10'. A sending buffer 370 in memory 352 progressively sends consecutive ones of the pictures F1, F2, through F4 (shown as four progressive pictures in most examples in this application, but not intended to be limited to such number) from the first computer 10 to second computer 10'. The pictures F1, F2, through F4 represent progressively greater detail in the depiction of the image to be transmitted from the first computer 10 to the second computer 10'. Also shown in the memory 352 of the first computer 10 of FIG. 3A is a receiving buffer 380 which receives the progressively more detailed images S1, S2, through S4 from the computer 10'. In step 258 of FIG. 2A, first computer 10 sends local first stage picture F1 to the second computer 10'. Correspondingly, step 258' of the program 25' for second computer 10' sends its first stage picture S1 to the first computer 10, where it is stored in the receiving buffer 380. In the first computer 10 of FIG. 3A, the first stage picture S1 received from the computer 10' is displayed to the user of the first computer using the display adapter 358. As long as the user of the first computer 10 continues to be interested in receiving additional, progressively more detailed pictures of the image being sent from the second computer 10', the user of the first computer 10 will continue to press on the mouse button which will be detected via the mouse adapter 362. In FIG. 2A, in step 262 the process periodically detects the mouse down states for both the first user computer 10 and the second user computer 10'. This detection is accomplished, as seen in FIG. 1A, by the transmission of a mouse down message 26 using the network program 60, from the first user computer 10 to the second user computer 10'. Correspondingly, the second user computer 10' uses the network program 60' to transmit a mouse down message 26' to the first computer 10. As long as step 262 of FIG. 2A periodically detects the mouse down states of both computers 10 and 10', then after the passage of a predetermined interval of time, the step 262 flows to step 264 wherein, if both of the mouse down states continue to exist, the first computer 10 sends the next stage picture F2 from the sending buffer 370 to the second computer 10'. In this example, the next picture, F2, shown in FIG. 3A is more detailed than picture F1. Correspondingly, control program 25' in the second user computer 10' flows from step 262' to 264' wherein, if both mouse down states are in existence, then second computer 10' sends the next progressively more detailed picture S2 to the first computer 10. In this case, the picture S2 is sent from the second computer 10' to the first computer 10 and is received in the receiving buffer 380. Picture S2, shown in FIG. 3A, is more detailed than the picture S1. The received pictures are simultaneously displayed in the respective computers to the users. In FIG. 2A, the control program 25 of the first computer 10 loops back from step 264 to step 262 for the program to periodically detect the mouse down states and if the states continue to exist, additional, progressively more detailed pictures F3 and F4 are transmitted from the sending buffer 370 of the first computer 10 to the second computer 10'. Correspondingly, the second computer 10' will progressively transmit progressively more detailed pictures S3 and S4 from the computer 10' to the receiving buffer 380 of computer 10. As long as both users continue to press the mouse buttons on their respective computers 10 and 10', the progressively more detailed images will be transmitted and displayed on their respective computers. If at some point in the transaction, either user decides not to view any additional, progressively more detailed pictures, that user merely removes the mouse down signal by removing the user's finger from the mouse button. Then step 264' or alternately step 264 will stop the transmission of further pictures from each computer to the other.

Figure 5A:
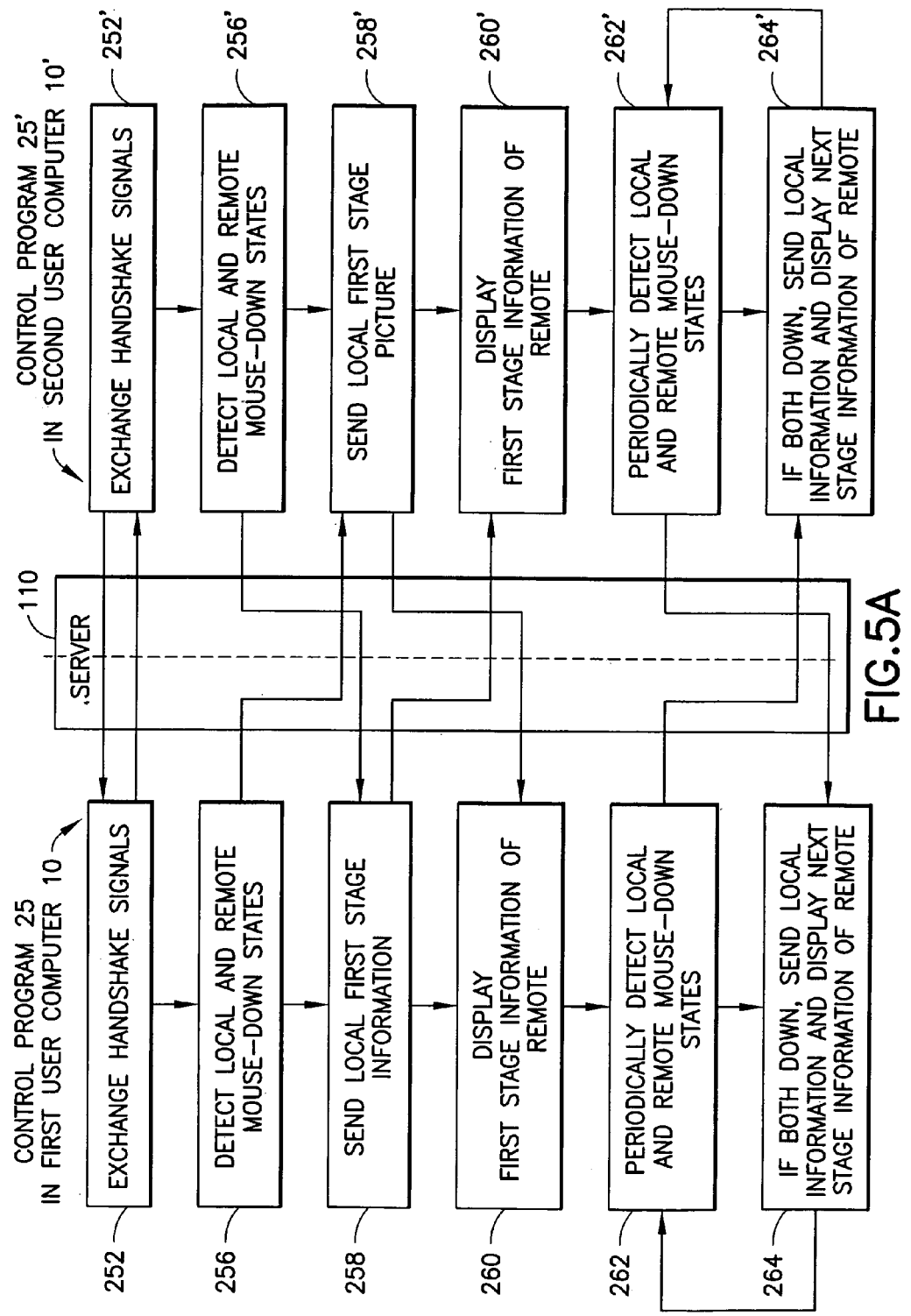
FIG. 5A is a network sequence diagram for the network shown in FIG. 4A.

FIG. 4A illustrates an alternate embodiment where the peer to peer network connection from the first computer 10 to the second computer 10' is through a server 110, for example, where the mailbox/chatroom application 1146 in server 110 serves the function of a chat room mailbox. The mailbox/chatroom application 1146 makes use of the payment application 1148 in server 110 if a payment is required to facilitate information disclosure. FIG. 5A is a network sequence diagram illustrating the processes performed in the peer to peer sequence shown in FIG. 2A, as messages between computers 10 and 10' pass through the server 110 in the network diagram of FIG. 4A running the mailbox/chatroom application 1146.

FIG. 1B illustrates an alternate embodiment in which a compressed image file F is transmitted from the first computer 10 to the second computer 10' which cannot be decompressed at the second computer 10' until an enable message 28 is transmitted from the first computer 10 to the second computer 10'. Correspondingly, a compressed image S is transmitted from the second computer 10' to the first computer 10 which cannot be decompressed until an enable message 28' is transmitted from the second computer 10' to the first computer 10. The compressed image F sent from the first computer 10 to the second computer 10' can be progressively decompressed at the second computer 10', if it is in a progressive format. Examples of progressive formats include an interlaced Graphics Interchange Format (GIF), an interlaced Portable Network Graphic (PNG), an interlaced Joint Bi-level Image Experts Group (JBIG), or a progressive Joint Photographic Experts Group (JPEG) format. Each of these respective interlaced formats can be progressively decompressed at the receiving computer.

An interlaced GIF, instead of being transmitted and displayed top-to-bottom like a normal image, is first displayed at its full size with a very low resolution, then at a higher resolution, until it finally attains a normal appearance. Interlaced GIFs appear first with poor resolution and then improve in resolution until the entire image has arrived, as opposed to arriving linearly from the top row to the bottom row.

Figures 2, 2B:
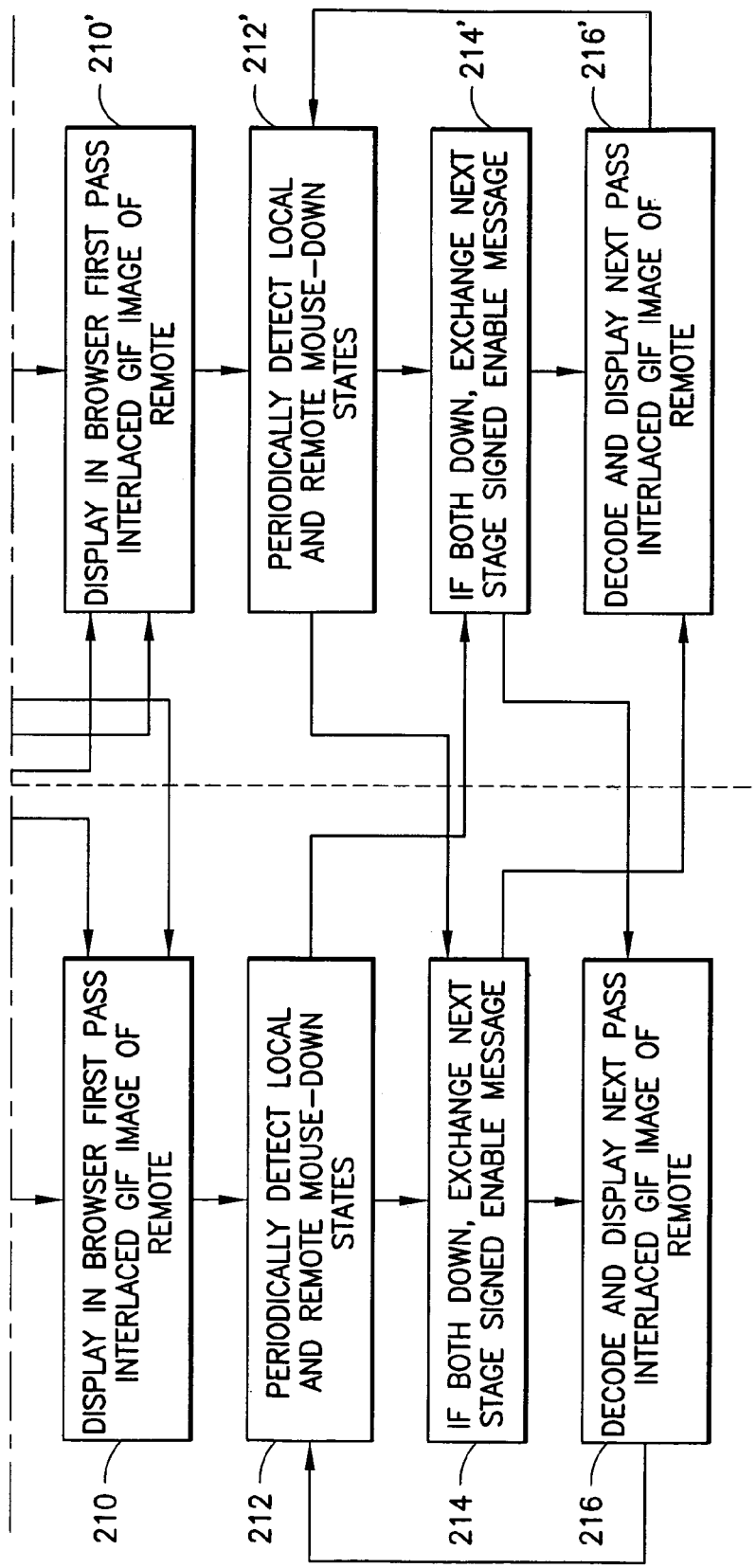
Figures 1, 3B:
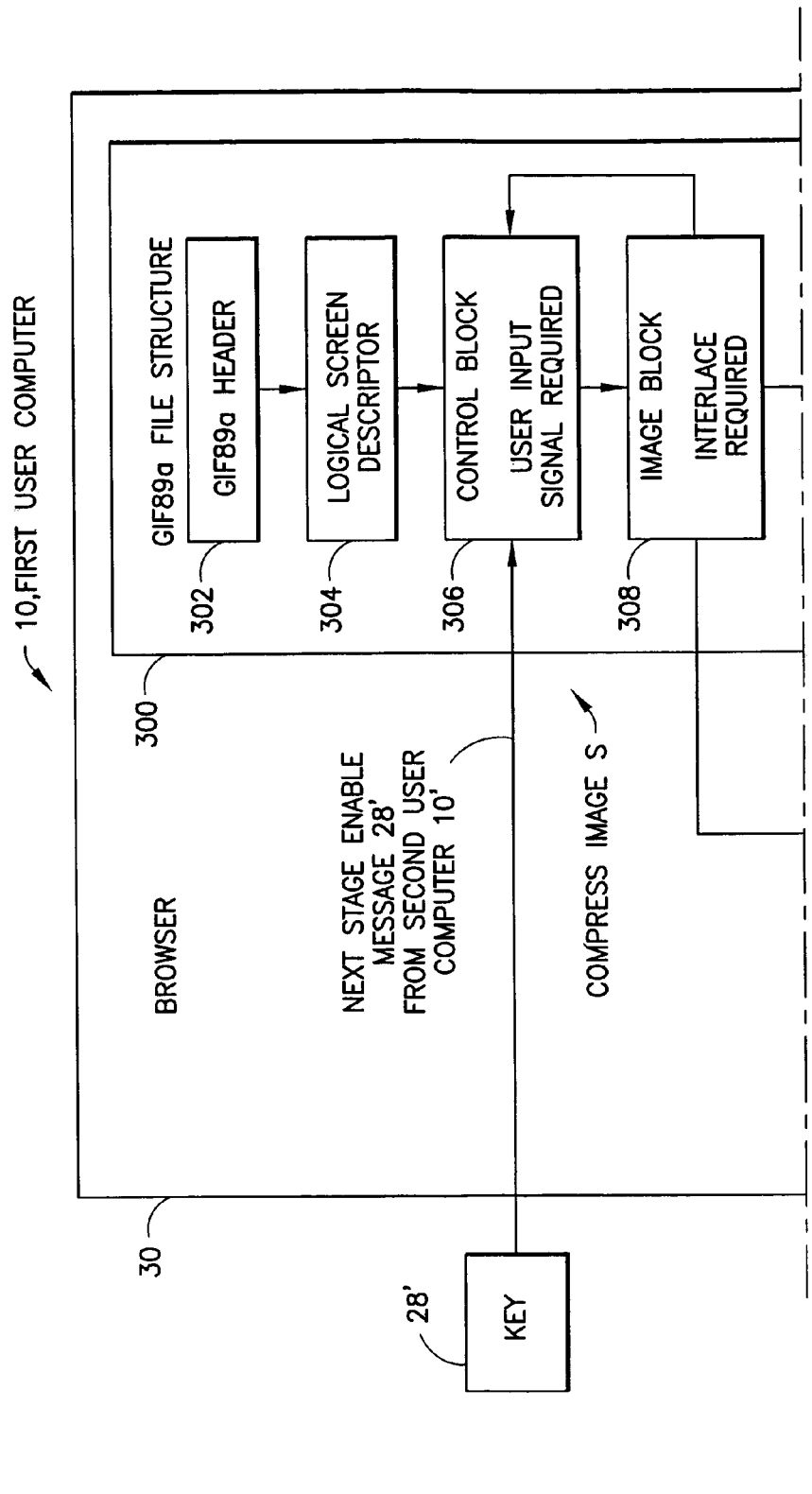
Figures 2, 3B:
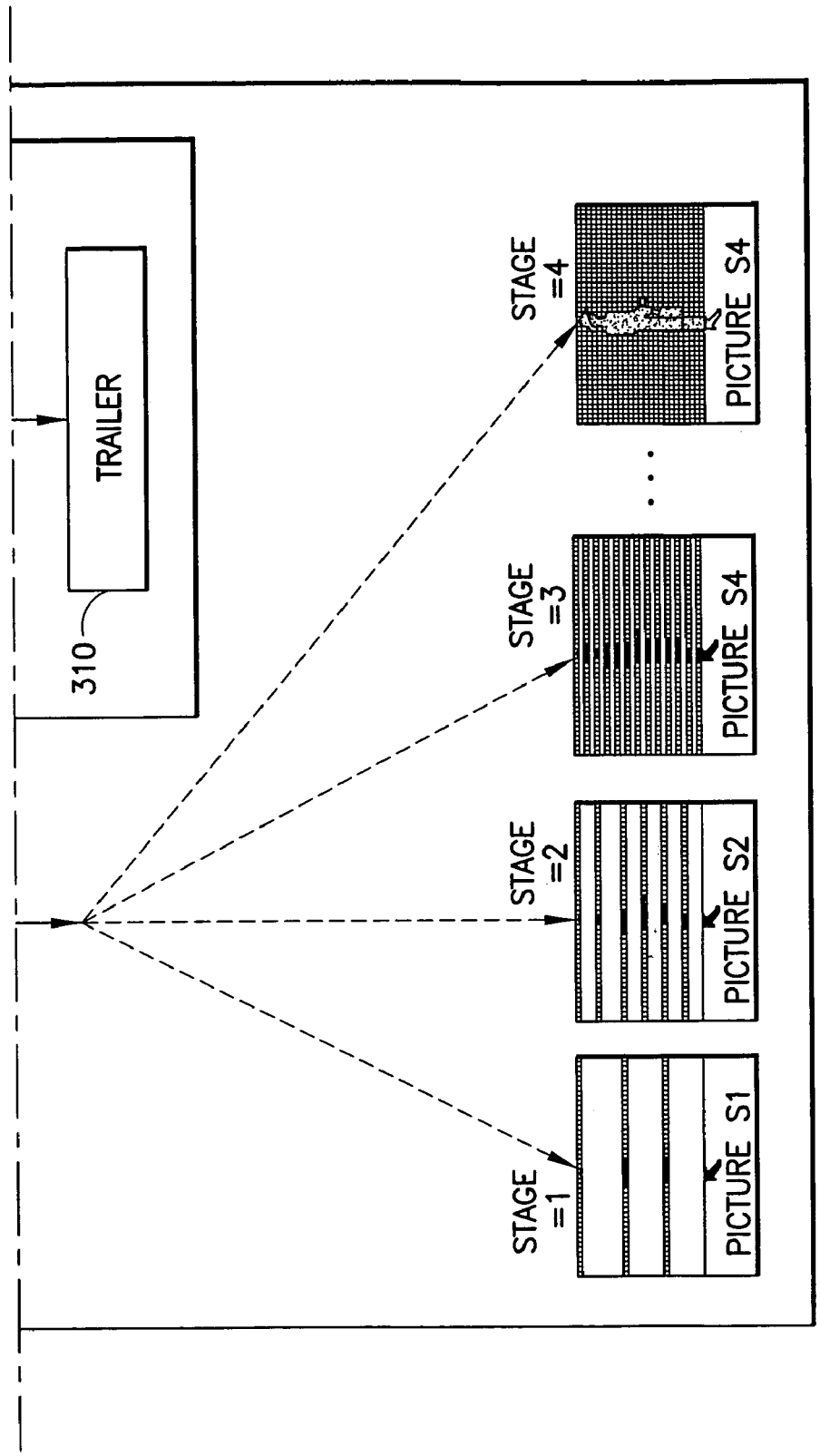

The first user computer 10 includes the control program 20 and second computer 10' includes control program 20', both of which are shown in the network sequence diagram of FIG. 2B-1. The control program 20 in FIG. 2B-1 begins in step 202 with the exchange of hand shake signals including a local public key of the first user computer 10, which is transmitted to the second computer 10'. The first computer 10 includes a public key/private key program 40 which is used to generate the enable message 28 to be sent to the second computer 10'. The public key/private key program 40 uses the first user's private key to sign the enable message 28 uniquely identifying the enable message 28 as being received from the first user computer 10. The second user computer 10' includes a public key/private key program 40' which uses the first users public key to verify that the enable message 28' was properly signed by the first user's private key. The enable message 28 is then used at the second user computer 10' to pass from step 202' to 204'. Correspondingly, the enable message 28' sent from the second user computer 10' to the first computer 10 is signed by the public key/private key program 40' in the second computer 10' using the private key of the second user. The enable message 28' received at the first user computer 10 is verified by the public key/private key program 40 in the first computer 10 applying the public key of the second user to verify that the second user signed the enabled message 28' with the second user's private key. The enable message 28' then enables the control program 20 in the first computer 10 to flow from step 202 to step 204. Public key cryptography is described, for example, in the book by Richard E. Smith entitled, "Internet Cryptography", published by Addison-Wesley, 1997.

In step 204 of FIG. 2B-1, the first computer 10 sends the compressed image F in message 24 which, in this example, is an interlaced GIF file, to the second computer 10' for display in step 210'. Correspondingly, the second computer 10' sends the compressed image S in message 24', which in this example, is an interlaced GIF file, to the first computer 10 for display in step 210. In the control program 20, step 204 then flows to step 206 which detects the local and remote mouse down states and in the control program 20', step 206' detects the local and remote mouse down states, then step 206 passes a mouse down message 26 to the second computer 10'. As long as both mouse buttons are pressed on both respective computers 10 and 10', step 206 flows to step 208 and step 206' flows to step 208'. In step 208, the first stage enable message signed with a local private key, as previously explained, is sent from the first computer 10 to the second computer 10'. Correspondingly, the step 208' in the second computer 10' sends the first stage enable message 28' signed with a local private key to the first computer 10. As shown in FIGS. 2B-1 and 2B-2 step 208 flows to step 210 in the first computer 10, wherein the interlaced GIF image S is decoded in a first pass as the stage 1 picture S1 shown in FIG. 1B. Correspondingly, in second computer 10', the interlaced GIF message F is decoded in a first pass as the stage 1 picture F1, which the browser 30' displays as shown in FIG. 1B.

Reference can now be made to FIGS. 3B-1 and 3B-2 which illustrate a GIF compressed image file S in the interlaced format being progressively decompressed in consecutive stages which can be locally controlled. FIG. 3B-1 shows the first user computer 10 in which the browser 30 in the computer 10 has received and is to display the interlaced GIF file S having the file structure 300. The interlaced GIF file structure 300, in this example, is a GIF 89A type file structure which is described in greater detail in the book by James D. Murray, et al., entitled "Graphics File Formats", $2^{nd}$ Edition, published by O'Reilly and Associates, 1996. The interlaced GIF file structure 300 includes the GIF 89A header 302 which is a small 6 byte character block containing the GIF version of the file. Also included in the file structure 300 is the local screen descriptor 304 which defines an area of pixels for the GIF image on the user's display. The control block 306 of the file structure 300 provides for user input options. Normally, when an interlaced GIF file is received by the browser 30, the GIF file is immediately rendered on the screen. However, if a user-input signal is required, as specified in the control block 306, the image rendering must wait until the next stage enable message 28' is received from the second user computer 10'. The control program 20 establishes what is to be considered as a user input signal. The image block 308 of the file structure 300 includes the requirement that the image must be interlaced. Interlacing is a way of saving and displaying the image data. For interlacing to occur, the image must be initially saved in the interlaced format when the image is created. Interlacing saves alternate rows, producing a venetian blind or blockfocusing effect, depending upon the browser's handling of interlacing. Interlacing stores the rows of the image in the order as follows:

stage 1: every $8^{th}$ row starting with row 0 stage 2: every $8^{th}$ row, starting with row 4 stage 3: every $4^{th}$ row, starting with row 2 stage 4: every 2 row, starting with row 1

Reference is made to FIG. 3B-2 which shows stage 1 for picture S1, stage 2 for picture S2, stage 3 for picture S3, and stage 4 for picture S4. These stages correspond to the progressively more detailed display of the compressed image S with each pass of the browser 30 through the loop provided from the image block 308 to the control block 306 of the GIF file structure 300. The flow from the control block 306 to the image block 308 can only be accomplished when a next stage enable message 28' is received from the second user computer 10'. The GIF file structure of 300 of FIG. 3B-1 concludes with a trailer 310 as shown in FIG. 3B-2. Other progressive or interlaced image compression file formats can be used as discussed above including JPEG, JBIG, and PNG, all of which are discussed in the above-cited James D. Murray, et al., book.

Referring back to FIG. 2B-2, the step 212 of the control program 20 periodically detects the local and remote mouse down states for the first program 20, and correspondingly step 212' periodically detects local and remote mouse down states for the program 20'. If the first and second users continue to be interested in viewing progressively more detailed images which are decompressed from the compressed images F and S, then they continue to hold down their respective mouse buttons (or keyboard key depression, as appropriate). Step 212 then flows to step 214 and if both mouse down states exist, then control program 20 sends the next stage enable message to the computer 10'. As detailed above, enable message 28 is signed with the private key of the first user at computer 10 and is sent to the second user computer 10' to enable the browser 30' and the second computer 10' to produce the stage 2 picture F2. Step 214 of the control program 20' correspondingly determines that if both mouse buttons are down, the next stage enable message 28' is sent from the second user computer 10' to the first user computer 10. Enable message 28' is signed by the private key of the user at the second computer 10'. When the enable message 28' is received at the first computer 10 as previously discussed, the next stage picture S2 will be decoded from the compressed file structure 300 in FIG. 3B-1 and displayed to the first user in computer 10. Step 216 in the control program 20 decodes and displays the next stage decompressed image from compressed GIF image S from the remote computer. Correspondingly, step 216' in the control program 20' decodes and displays the next stage decompressed image from compressed GIF image F from the remote computer 10. Step 216 loops back to step 212 in the control program 20 to consecutively decode and display the pictures S2, S3, and S4 from the compressed image S as long as both mouse buttons are down. Similarly, step 216' loops back to step 212' in control program 20' to progressively decode and display the next pass interlace GIF image for the picture F2, F3, and F4 for the progressively decoded GIF file structure for the compressed image F received in the second computer 10'.

Figures 2, 5B:
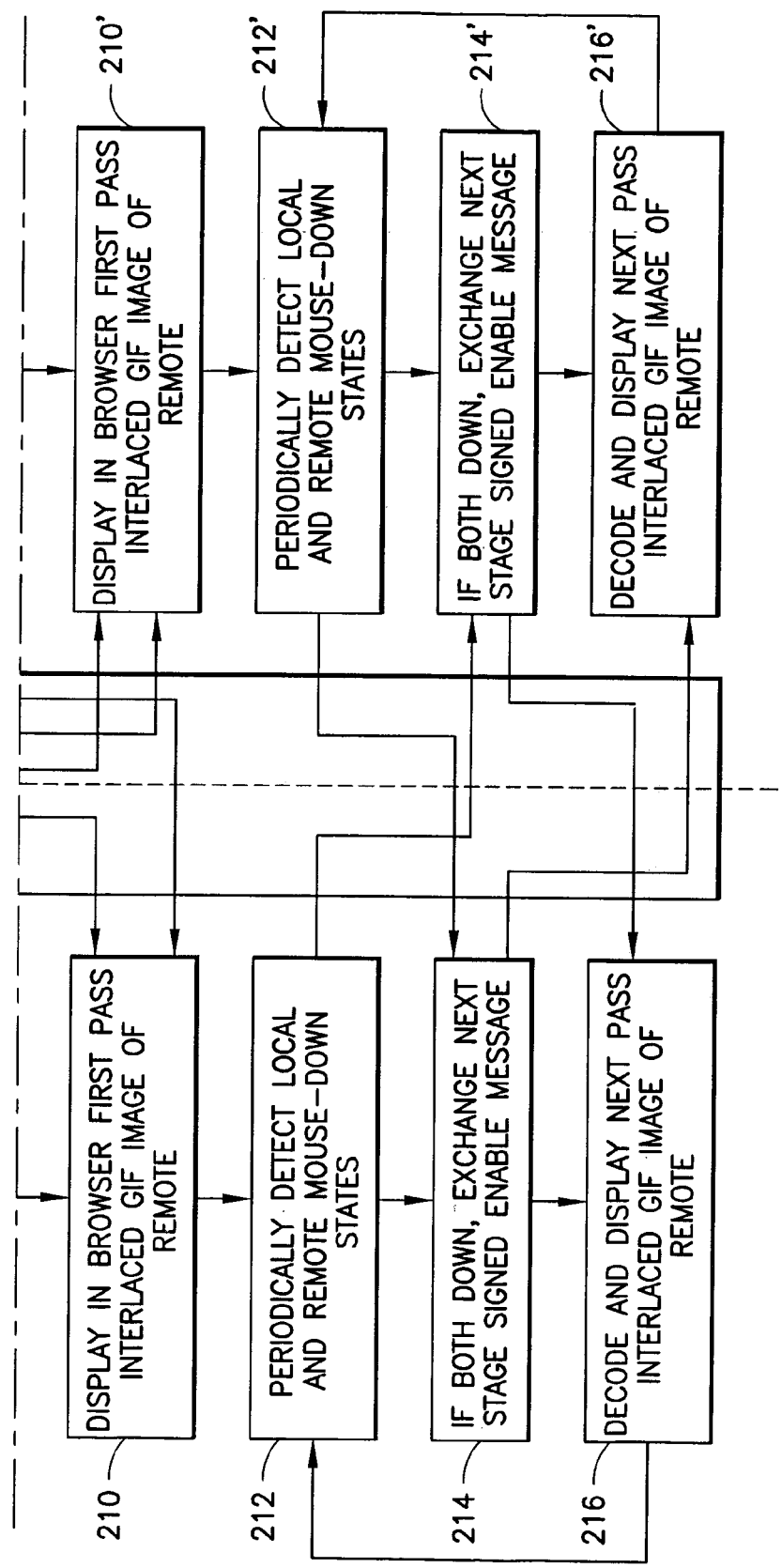

FIG. 4B is a network diagram illustrating that the peer to peer relationship between the first computer 10 and the second computer 10' is established by the mailbox/chatroom application 1146 in the server 110, which functions as a chat room mailbox. FIGS. 5B-1 and 5B-2 are network session diagrams illustrating the messages shown in FIGS. 2B-1 and 2B-2, which pass through the server 110 in the network diagram of FIG. 4B.

The browser program 30 in computer 10 and the browser program 30' in computer 10' can be, for example, a Microsoft Internet Explorer 5 browser, which is capable of being programmed to perform functions such as described for the handling of the GIF 89A file structure 300 in FIG. 3B-1. Reference is made to the book by Scott Roberts, entitled "Programming Microsoft Internet Explorer 5," Microsoft Press, 1999, for extensive discussion of how to customize the functions of the browsers 30 and 30' to conform with the functions described in connection with FIGS. 3B-1 and 3B-2. Other browsers can be used as browser 30 and/or 30', for example, the Netscape Navigator browser, and many other browsers which are available, for example, Hot Java by Sun Microsystems, and Web Explorer by IBM Corporation.

Another image compression algorithm for progressive information is transparent GIF. A transparent GIF is an image that has a certain bit set on one of its colormap entries, so that a Web browser's background will show through wherever that color appears in the image. Transparent GIFs are useful because they appear to blend in smoothly with the user's display, even if the user is operating a background color that differs from the one expected by the developer. The developers accomplish this display appearance by assigning one color to be transparent—if the web browser supports transparency, that color will be replaced by the browser's background color, whatever it may be.

Still another image compression algorithm is progressive JPEG. A simple or "baseline" JPEG file is stored as one top-to-bottom scan of the image. Progressive JPEG divides the file into a series of scans. The first scan shows the image at the equivalent of a very low quality setting, and therefore requires very little space. Each following scan gradually improves the image quality. Each scan adds to the data already provided, so that the total storage requirement is roughly the same as for a baseline JPEG image of the same quality as the final scan. (Basically, progressive JPEG is just a rearrangement of the same data into a more complicated order.) The advantage of progressive JPEG is that if an image is being viewed on the fly as it is transmitted, one can see an approximation to the whole image very quickly, with gradual improvement of quality as one waits.

FIG. 1C shows an alternate embodiment of the system and method, wherein the information exchanged is an XML text document which reveals progressively greater detail. A job applicant, for example, at the first user computer 10 can send a resume to a prospective employer, for example, at the second user computer 10', in the form of an XML document. The employer sends back a job description in the form of an XML document. The job applicant sends a single resume document 23F. The employer can see progressively more detail of the document as long as both mouse buttons are down. Similarly, the employer sends a single job description document 23'. The job applicant can see progressively more detail of the document as long as both mouse buttons are down.

Extensible Markup Language (XML) is a reduced version of Standard Generalized Markup Language (SGML), used for defining and interpreting tags according to SGML rules. A tag is a command inserted in a document that specifies how the document should be formatted. XML permits the creation of customized tags, enabling the definition, transmission, validation, and interpretation of data between applications. A more detailed description of XML can be found on the Internet web site of the World Wide Web Consortium, http://www.w3.org/XML/. A tutorial for XML is available in the book by Simon North and Paul Hermans, "Teach Yourself XML in 21 Days", Macmillan Computer Publishing, 1999. Another instructive text on XML is the book by Hiroshi Maruyama, Kent Tamura, Naohiko Uramoto entitled "XML and Java: Developing Web Applications", Addison-Wesley Pub Co., 1999.

Each XML document begins with an XML declaration, an example of which is "<?XML VERSION="1.0 STANDALONE="NO"?>". The declaration identifies the XML code and the code version of the XML standard. The declaration also specifies whether the document can be treated as a stand-alone document or whether a document type definition (DTD) must also be retrieved in order to make complete sense of the contents. In the alternate embodiment of FIG. 1C, an external DTD is required to correctly interpret the XML document. The XML declaration is a processing instruction which is identified by the "?" at beginning and end. Both the first user computer 10 and the second user computer 10' of FIG. 1C include an XML processor/parser 27 and 27', respectively, to interpret the XML tags and elements in the XML document's and to organize them into the progressive stages that the control program 20C and 20C', respectively, presents to the first or second user, respectively. The guideline for how to group the tagged elements of the XML file into the progressive stages is provided in the particular DTD identified in the second line of the XML document, tagged as "DOCTYPE". The first two lines of the XML document prepared by the job applicant at the first computer 10, are as follows:

<?XML VERSION="1.0 STANDALONE="NO"?>
<!DOCTYPE Resume SYSTEM "resume.dtd">

The DOCTYPE tag refers to the root element of the XML document, which in this case is the element with the <Resume> tag. The DOCTYPE tag also identifies the DTD that validates each of the document elements and groups them into the progressive stages that will be passed to the control program 20C' in the employer's second computer 10'. In this case, the DTD is in a file named "resume.dtd" that is in the "SYSTEM" directory of the second computer 10'. The root element with the <Resume> tag, in this example, is the outermost element in the XML document. The XML document begins with the <Resume> tag and ends with the </Resume> tag.

After the XML declaration and the DOCTYPE element, the remaining elements in the XML document depend on the purpose of the particular document. The example XML document prepared by the job applicant at the first computer 10 for an employment resume is presented as follows in Table 1, followed by an example DTD for all such employment resume XML documents, which is shown in Table 2. Note that every unit of text (such as a paragraph or abstract) or unit of other type of information (such as digitized voice segments, images, and the like) is surrounded with a beginning element tag portion e.g., "<PARAGRAPH>" and an ending element tag portion e.g., "</PARAGRAPH>".

Table 1: An Example XML Document for an Employment Resume

<?XML VERSION=" 1.0 STANDALONE="NO"?>
<!DOCTYPE Resume SYSTEM "resume.dtd">
<Resume>
<TITLE>Employment Resume</TITLE>
<NAME>John X. Smith </NAME>
<ADDRESS>Smith City, Virginia</ADDRESS>
<PROFESSION>Software Engineer</PROFESSION>
<YEARS_EXPERIENCE>10</YEARS_EXPERIENCE>
<SALARY_REQUIREMENT>$150,000</SALARY_REQUIREMENT>
<LOCATION_PREFERENCE>Virginia</LOCATION_PREFERENCE>
<EDUCATION>BS Electrical Engineering, MIT, 1990</EDUCATION>
<EMPLOYMENT_HISTORY>
<PARAGRAPH>June 2000–January 1999: Smith Enterprises, Owned and operated engineering consulting firm. </PARAGRAPH>
<PARAGRAPH>January 1999–June 1990, XYZ International Co., employed as a Junior Engineer and then promoted to a staff Engineer, designing virtual reality displays.
</PARAGRAPH>
</EMPLOYMENT_HISTORY>
</Resume>

Table 2 shows an example DTD "resume.dtd" that is in the "SYSTEM" directory of the employer's second computer 10' as shown in the following Table 2. The example XML Document For An Employment Resume of Table 1 is sent by the job applicant at the first computer 10 to the employer at the second computer 10', where the Example DTD "resume.dtd" in Table 2 validates each of the document elements of the XML document in Table 1 and groups them into the progressive stages that are passed to the control program 20C' in the second computer 10'. Following the job applicant's computer 10 handshake step 222 of FIG. 2C-1, step 224 sends the XML document 23 and the DTD for the resume to the employer's computer 10'. Step 226 detects the mouse down states. The employer's computer performs similar steps 222', 224', and 226', sending the XML document 23' and the DTD for the job description.

Table 2: An Example DTD "resume.dtd"
"resume.dtd"
If DOCTYPE=<Resume>, then
<TITLE>=STAGE 1
<NAME>=STAGE 1
<ADDRESS>=STAGE 1
<PROFESSION>=STAGE 1
<YEARS_EXPERIENCE>=STAGE 2
<SALARY_REQUIREMENT >=STAGE 3
<LOCATION_PREFERENCE>=STAGE 4
<EDUCATION>=STAGE 5
<EMPLOYMENT_HISTORY >=STAGE 5

The prospective employer's computer 10' will receive the XML document from the job applicant's first computer 10, and will pass it to the XML processor/parser 27'. The XML processor/parser 27' interprets the XML tags and elements in the XML document and organizes the tagged parts into progressive stages for presentation to the user, in accordance with the definition of those stages in the DTD identified for that document. The group stages are passed to the control program 20C' in the second computer 10' that progressively presents each stage to the prospective employer, using the process described in the flow diagram of FIGS. 2C-1 and 2C-2.

Figures 2, 2C:
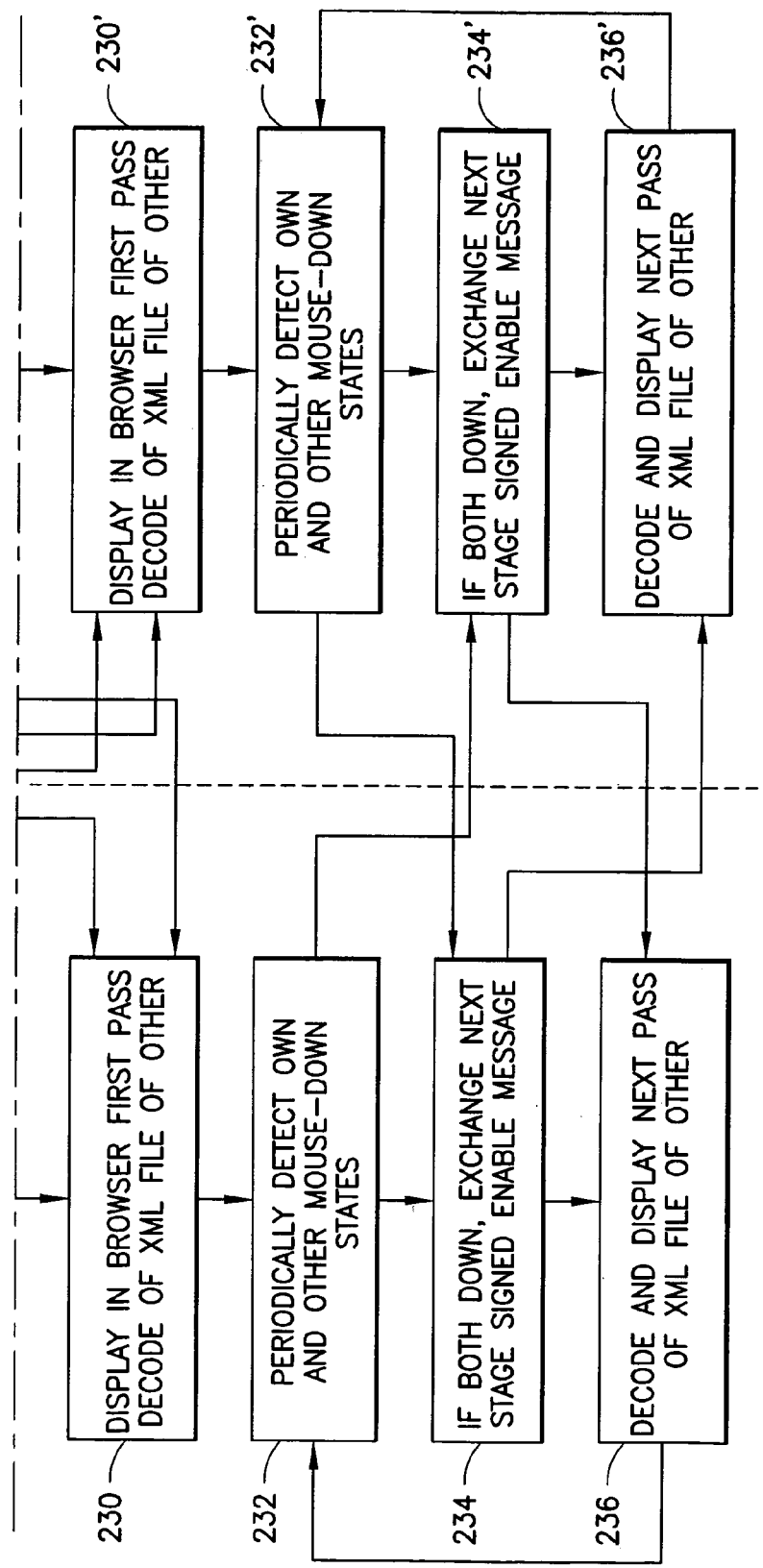

FIGS. 2C-1 and 2C-2 show the job applicant's computer 10 sending an enable message in step 228, displaying the first pass decoded text for stage 1 in step 230, periodically detecting mouse down states in step 232 and sending the next stage enable message in step 234. Step 236 loops to repeatedly decode and display the next stages. The employer's computer 10' performs similar steps at 232', 234', and 236'.

In the example, the second computer 10' will present progressive stages to the employer as follows:

Stage 1 will present the information:
    <TITLE>Employment Resume</TITLE>
    <NAME>John X. Smith </NAME>
    <ADDRESS>Smith City, Virginia</ADDRESS>
    <PROFESSION>Software Engineer</PROFESSION>

Stage 2 will present the information:
    <YEARS_EXPERIENCE>10</YEARS_EXPERIENCE>

Stage 3 will present the information:
    <SALARY_REQUIREMENT>$150,000</SALARY_REQUIREMENT>

Stage 4 will present the information:
    <LOCATION_PREFERENCE>Virginia</LOCATION_PREFERENCE>

Stage 5 will present the information:
    <EDUCATION>BS Electrical Engineering, MIT, 1990</EDUCATION>
    <EMPLOYMENT_HISTORY>
    <PARAGRAPH>June 2000–January 1999: Smith Enterprises, Owned and operated engineering consulting firm. </PARAGRAPH>
    <PARAGRAPH>January 1999–June 1990, XYZ International Co., employed as a Junior Engineer and then promoted to a staff Engineer, designing virtual reality displays.

</PARAGRAPH>
    </EMPLOYMENT_HISTORY>

Note that the order of occurrence of the elements in the XML document is not important, since the DTD will sort the elements by progressive stages, as they are defined in the DTD. Also note that there are five progressive stages defined by the DTD. There can be as many stages as needed to convey the desired information, since the control program 20C' shown in the flow diagram of FIGS. 2C-1 and 2C-2 keep looping to the next stage until there are no more stages to present, or until one of the mouse-down signals turns off.

Each XML processor/parser 27 and 27' is a computer program in the computer 10 and 10' respectively. Each XML processor/parser 27 and 27' includes an application program interface (API). The XML APIs is a tree-based API that compiles an XML document into an internal tree structure, then allows the control program 20C and 20C', respectively, to navigate the tree. A Document Object Model (DOM) includes a standard tree-based API for XML documents. An example of suitable tree-based API is given in the Document Object Model (DOM) Level 1 Specification Version 1.0, W3C Recommendation 1 Oct., 1998, at http://www.w3.org/TR/REC-DOM-Level-1/. Also see the book by Hiroshi Maruyama, Kent Tamura, Naohiko Uramoto entitled "XML and Java: Developing Web Applications", Addison-Wesley Pub Co., 1999.

The example given so far has focused on the employment resume send by a job applicant at the first computer 10 to a prospective employer at the second computer 10'. Since this is an example of an asymmetric document exchange, the example continues with a description of the corresponding five progressive stages of presentation of an Employer's Job Description document prepared by the prospective employer at computer 10' and sent to the job applicant at computer 10.

Employer's Job Description document

Table 3: An Example XML Document for an Employer Job Description
    <?XML VERSION="1.0 STANDALONE="NO"?>
    <!DOCTYPE Job Description SYSTEM "jobdescription.dtd">
    <Job Description>
    <TITLE>Job Description</TITLE>
    <NAME>ABC Corporation</NAME>
    <ADDRESS>Tyson's Corner, Virginia</ADDRESS>
    <CATEGORY>Internet Startup</CATEGORY>
    <EXPERIENCE_REQUIRED>7</EXPERIENCE_REQUIRED>
    <ANNUAL_SALARY>$135,000</ANNUAL_SALARY>
    <LOCATION>Virginia</LOCATION>
    <EDUCATION_REQUIRED>BS or MS in Electrical or Computer Engineering </EDUCATION_REQUIRED>
    <EMPLOYMENT_DESCRIPTION>
    <PARAGRAPH>The successful applicant will have experience in management of junior engineers, will possess the ability to design webpage applications including virtual reality displays, and have excellent presentation skills.</PARAGRAPH>
    </EMPLOYMENT_DESCRIPTION>
    </Job Description>

Table 4 shows An Example DTD "jobdescription.dtd" that is in the "SYSTEM" directory of the job applicant's first computer 10. The Example XML Document For Employer's Job Description in Table 3 is sent by the employer at the second computer 10' to the job applicant at the first computer 10, where the Example DTD "jobdescription.dtd" validates each of the document elements of the XML document of Table 3 and groups them into the progressive stages that are passed to the control program 20C in the first computer 10.

Table 4: An Example DTD "jobdescription.dtd"
"jobdescription.dtd"
If DOCTYPE=<Job Description>, then
    <TITLE>=STAGE 1
    <NAME>=STAGE 1
    <ADDRESS>=STAGE 1
    <CATEGORY>=STAGE 1
    <EXPERIENCE_REQUIRED>=STAGE 2
    <ANNUAL_SALARY>=STAGE 3
    <LOCATION>=STAGE 4
    <EDUCATION_REQUIRED>=STAGE 5
    <EMPLOYMENT_DESCRIPTION>=STAGE 5

The job applicant's first computer 10 will receive the XML document from the employer's second computer 10', and will pass it to the XML processor/parser 27. The XML processor/parser 27 interprets the XML tags and elements in the XML document and organizes the tagged parts into progressive stages for presentation to the job applicant, in accordance with the definition of those stages in the DTD identified for that document. The grouped stages are passed to the control program 20C that progressively presents each stage to the job applicant, using the process described in the flow diagrams of FIGS. 2C-1 and 2C-2.

In the example, the job applicant's first computer 10 will present progressive stages to the user as follows:

Stage 1 will present the information:
    <TITLE>Job Description</TITLE>
    <NAME>ABC Corporation</NAME>
    <ADDRESS>Tyson's Corner, Virginia</ADDRESS>
    <CATEGORY>Internet Startup</CATEGORY>

Stage 2 will present the information:
    <EXPERIENCE_REQUIRED>7</EXPERIENCE_RE- Stage 3 will present the information:
    <ANNUAL_SALARY>$135,000</ANNUAL_SAL-
        ARY>

Stage 4 will present the information:
    <LOCATION>Virginia</LOCATION>

Stage 5 will present the information:
    <EDUCATION_REQUIRED>BS or MS in Electrical or
        Computer Engineering </EDUCATION_REQUIRED>
    <EMPLOYMENT_DESCRIPTION>
    <PARAGRAPH>The successful applicant will have
        experience in management of junior engineers, will
        possess the ability to design webpage applications
        including virtual reality displays, and have excellent
        presentation skills.</PARAGRAPH>
    </EMPLOYMENT_DESCRIPTION>

Note that the order of occurrence of the elements in the XML document is not important, since the DTD will sort the elements by progressive stages, as they are defined in the DTD. Also note that there are five progressive stages defined by the DTD. There can be as many stages as needed to convey the desired information, since the control program 20C shown in the flow diagrams of FIGS. 2C-1 and 2C-2 keep looping to the next stage until there are no more stages to present, or until the mouse-down signal turns off. However, the number of stages in the job applicant's resume document of Table 1 should be the same as number of stages in the prospective employer's job description document of Table 3, in order that each party will receive progressive information at each stage of the transaction.

The XML document content has been disclosed as a digital text body divided into stages of progressively greater detail by using XML tags. This principle of the invention applies to any digital content that can be divided into stages by using XML tags. Examples include digital audio segments, digital video segments, digital virtual reality segments, and the like.

Figure 6:
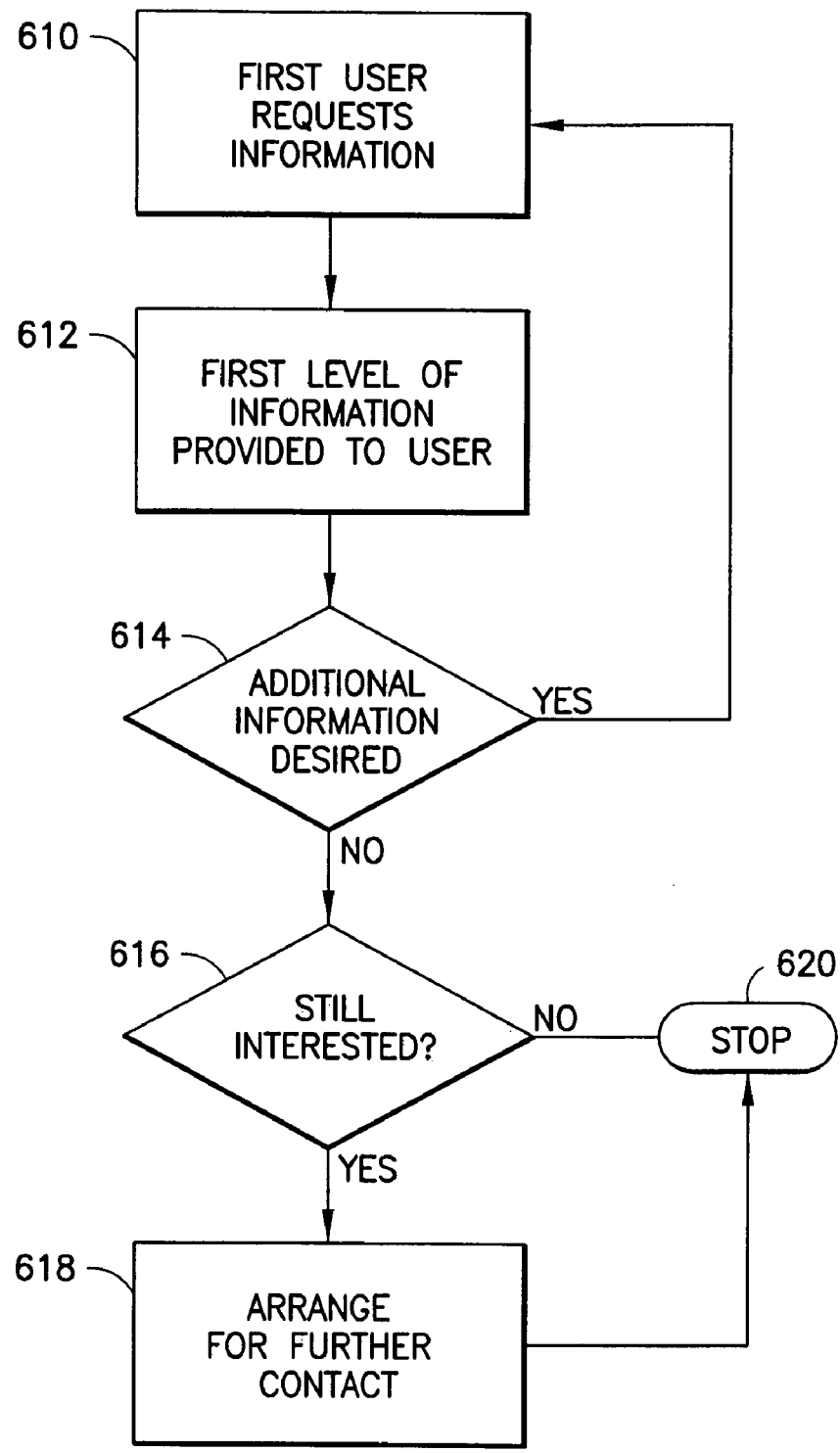
FIG. 6 is a flow chart showing the process of providing information to a user.

FIG. 6 illustrates the process of providing information to an user. The server 110 receives a request for information from an user at 610 and the server 110 next provides the first level of information to the user at 612. The server 110 then queries the user if an additional level of information is desired at 614. If the user responds "yes" to the query, the server 110 returns to 612 to provide the next level of information. If the user responds "no" to the 614 query, the server 110 queries the user if they are still interested at 616. If the user answer "yes" to the 616 query, the server 110 arranges at 618 for further contact for the continued disclosure of information and moves the process to stop at 620. If the user responds "no" to the 616 query, the server 110 then moves the process to stop at 620. The process as described in FIG. 6 can be performed on a subsequent user in substantially the same manner as described herein or on two or more users simultaneously where the server 110 provides levels of information to each user from the other user's database (such multiple user scenario is shown in greater detail in FIG. 10).

Figure 7:
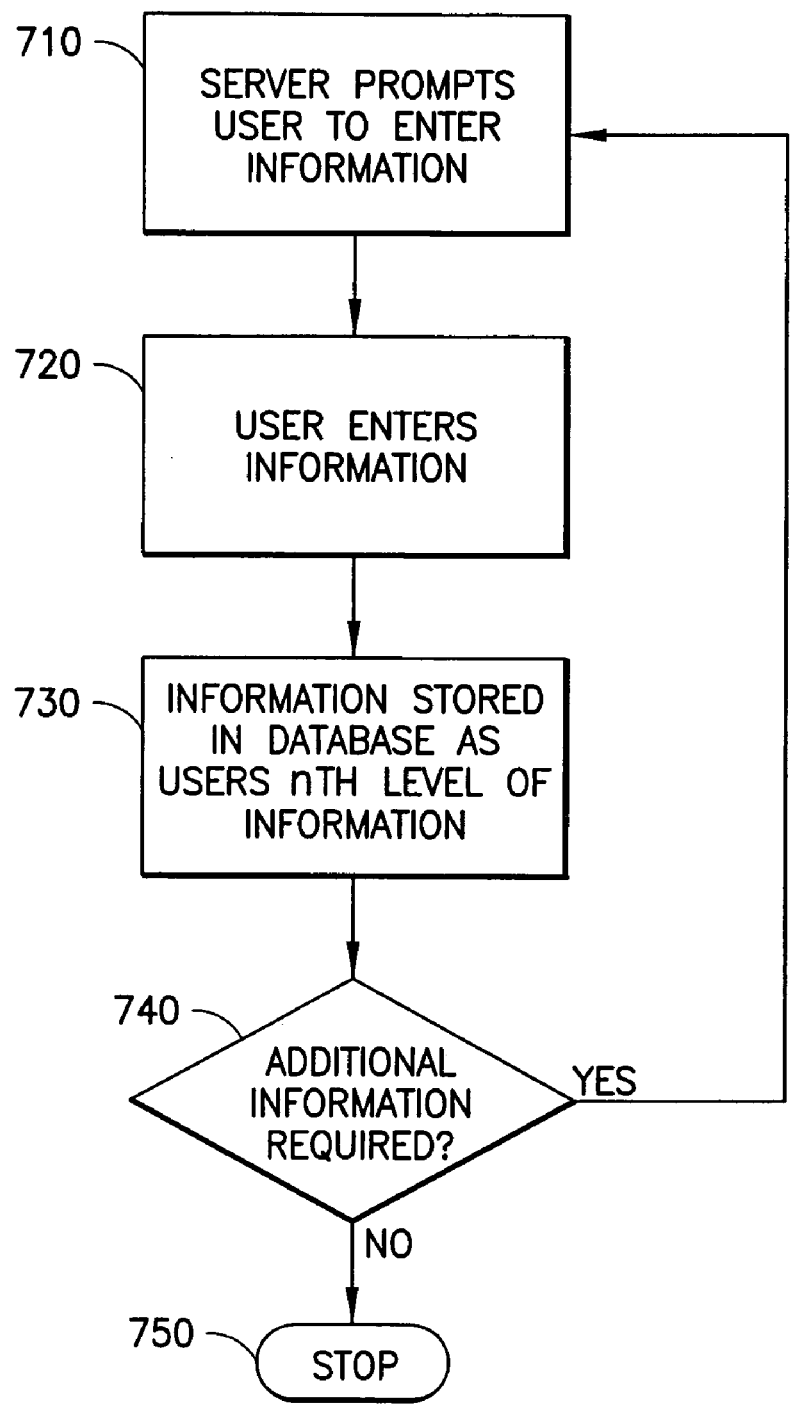
FIG. 7 is an illustration of the process of acquiring information from an user.

FIG. 7 illustrates the process of acquiring information from an user. The server 110 prompts the user to enter information in 710, the user next enters information at 720, the information entered by the user is stored in the first user computer database 800 (as shown in FIG. 8 detailed below) as the first user's nth level of information (i.e. the first information is stored as 803, the second level of information is stored at 804, etc.) The server 110 queries the first user at 740 if an additional level of information is to be provided. If the first user responds "yes" to the query at 740, the server 110 returns to 710 to receive the next level (n+1) of information. If the first user responds "no" to the query at 740, the server 110 proceeds to stop at 750. The process illustrated in FIG. 7 can be performed on a subsequent user in substantially the same manner as described herein, e.g. the second user to acquire the levels of information as shown in FIG. 9. This process of acquiring information from a user can be performed through a database, in a chat room, or wherever applicable. The media transmitted between users can be text, audio, image, motion video, biometric, or the like.

Representative of databases maintained by the server 110 are first user computer database 800 and second user computer database 900 as shown in FIGS. 8 and 9. As shown in FIG. 8, first user computer database 800 may include information concerning the first user computer's name and contact information at 801, the interest category of the first user at 802, the first level of information 803, the second level of information 804, the third level of information 805, and the fourth level of information 806.

As shown in FIG. 9, second user computer database 900 may include information concerning the second user's name and contact information at 901, the interest category of the second user at 902, the first level of information 903, the second level of information 904, the third level of information 905, and the fourth level of information 906.

Figure 10:
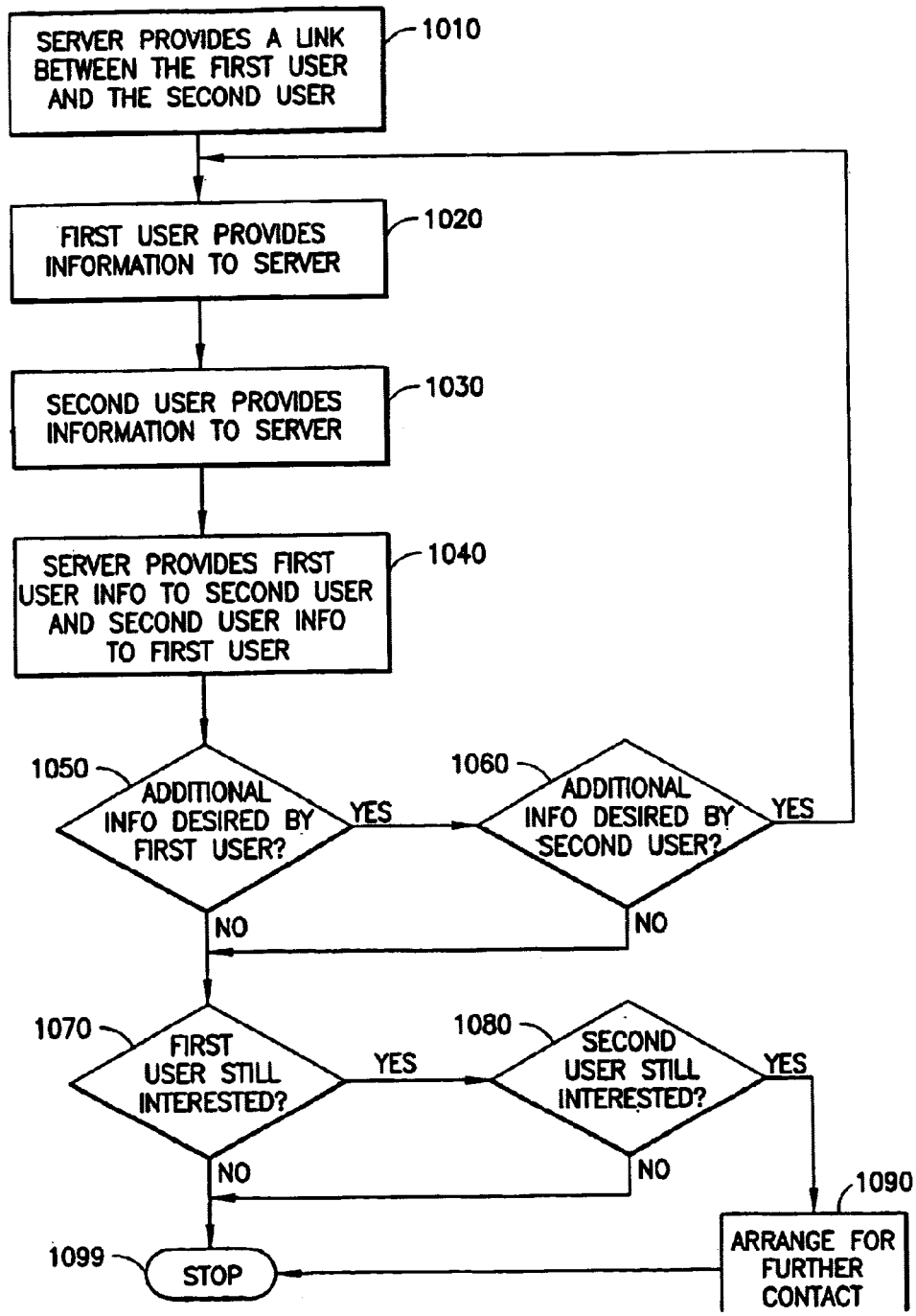
FIG. 10 is a flow chart of the operation of interactive (or real-time) information exchange between two users.

The present method of controlled disclosure of information can be performed in a number of applications (e.g. an apartment roommate renters information, dating link between two users, a negotiation between seller and buyer (e.g. an auction), a joint venture between two firms, or a job opportunity application). FIG. 10 is a flow chart of the operation of interactive (or real-time) information exchange between two users operating computers. The server 110 provides a link between a first user computer and a second user computer at 1010. The first user provides information to the server at 1020 and the second user provides information to the server at 1030. The server then provides the information from the first user to the second user and the information from the second user to the first user at 1040. At 1050, the server queries the first user if additional information is desired. If the first user responds "yes" to the 1050 query, the server queries the second user at 1060 if additional information is desired. If the second user responds "yes" to the 1060 query, the process returns to 1020 for information collection from the first user. If either the first user at 1050 or the second user at 1060 responds "no" to the respective query for additional information, the first user is queried at 1070 if they are still interested in information from the second user. If the first user at 1070 responds "yes", the second user at 1080 is queried if they are still interested in information from the first user. If the second user at 1080 responds "yes", the server arranges at 1090 for further contact between the two users at another time. The server then closes the link between the first and second users at stop 1099. If either the first user's response at 1080 or the second user's response at 1090 is "no", the server closes the link between the first and second users at stop 1099.

At any time, either user can indicate, through any recognized termination response, that they are not interested in continuing information disclosure to the other user. Such response could be the release of a mouse button, wherein the picture is sent to the display screen in increasing focus only during a time that the mouse button is held down; the pressing of any key on the keyboard; the clicking of the mouse on hypertext or an icon monitored by the server 110; or any other response that would allow the server to understand that either user is not interested in further information disclosure. The server 110 then terminates information disclosure between the users upon receipt of the termination response.

The information to transfer can be a picture, as in the above scenario, a textual display, an audio track, a video playback, or any other form of information that permits the progressive disclosure of information. Alternatively, the out-of-focus picture in the above scenario could consist of an in-focus picture comprised of a number of tiles placed in any order (e.g. a random picture mosaic increasingly aligning to form the completed image), an image loaded from top to bottom or from side to side, or any other progressive display/transmission method. Further, a person skilled in the art will recognize that this disclosure of information can be used in a number of applications, including a roommate situation where one user wishes to attract a certain roommate, e.g. someone who will accept rooming with a large pet, a bassoonist, or a loud snorer, or the roommate situation can include a person desiring to locate a person to share the responsibility of an apartment with specific amenities, e.g. two bedrooms and two baths. A further example of an interactive dating scenario could occur in a theme park where terminals are situated throughout the park and two interested users can exchange information and as a final step can establish a place and time to meet.

In an alternative application, an entity, person or corporation, acting as a first user, provides initial information to a server. The first user then specifies an initial threshold level that must be satisfied before additional information is supplied from the server. A second user contacts the server and likewise provides initial information. The server then compares the information from the second user, interactively or in a delayed manner, and determines whether the threshold level requirements established by the first user have been reached. If the threshold level is satisfied, the server then effects the disclosure to the second user and proceeds to the next level of information disclosure.

Though the next level and all subsequent levels of information disclosure can be comprised of any number of steps, the progressive disclosure of information can be suspended or terminated by either user. For example, if the users are employer and prospective employee, an employer initially supplies information regarding an available position at the company to the server. The server collects such information and inputs the data into an information supply conduit, such as a website on the Internet, which a prospective employee can peruse. The employee indicates interest in the position and supplies information on their qualifications. The server then supplies such information to the employer for preliminary review of the prospective employee's qualifications. Alternatively, the server weighs the prospective employee's qualifications against preliminary data that the employer supplied during the initial position disclosure. If the prospective employee meets the initial qualifications of the employer, an initial disclosure is made and if the employer is interested in further pursuing the prospective employee for the position, the employer furnishes or authorizes, either tacitly through initial information disclosure or directly to the server, additional information disclosure by the server to the prospective employee.

If the prospective employee is not interested in further pursuing the position upon additional information disclosure by the employer, the prospective employee can terminate interest in further information disclosure by the server to the employer. However, if the employee's interest continues, information disclosure occurs in the above-described manner until either user terminates the information disclosure. In this employment scenario, the information disclosure can optionally terminate by the absence of a reply by either user after a certain period of time has lapsed between response by either user.

FIGS. 11A-1 and 11A-2 are functional block diagrams of the server 110, showing the memory 1102 of the server 110 storing components of software program objects needed to perform the operations of handling customized discounts and payment plans and handling digital coupons. The memory 1102 of the server 110 is connected by the system bus 1104 to the central processor 1110 that executes the programmed instructions stored in the memory 1102. Bus 1104 is also connected to the merchant's database 800 and 900. The TCP/IP network adapter 1106 is connected by the bus 1104 to the memory 1102, for connecting the server 110 to the first and second computers 10 and 10'. The banking network adapter 1112 is connected by the bus 1104 to the memory 1102, for connecting the server 110 to a private banking network and banking servers which can be used by the server 110 to check credit histories and to arrange for credit card, debit card, or E-Cash payments by the user. The central processor 1110 can be, for example, an IBM RS/6000 Enterprise Server, an IBM AS/400e Server, or the like.

FIGS. 11A-1 and 11A-2 show the various functional modules of the server 110 arranged in an object model. The object model groups the various object-oriented software programs into components which perform the major functions and applications in the server 110. Enterprise Java Beans (EJB) is a software component architecture for servers, which is suitable for embodying the object-oriented software program components of FIGS. 11A-1 and 11A-2. A description of E-Commerce server programming applications developed with Enterprise Java Beans is provided in the book by Ed Roman entitled "Mastering Enterprise Java Beans", published by John Wiley and Sons, 1999. A description of the use of an object model in the design of a web server for E-Commerce applications is provided in the book by Matthew Reynolds entitled "Beginning E-Commerce", Wrox Press Inc, 2000, (ISBN: 1861003986). The components of object-oriented software programs in the object model of memory 1102 are organized into a business logic tier 1114, a presentation tier 1115, and an infrastructure objects partition 1122. The business logic tier 1114 is further divided into two partitions: an application services objects partition 1124 and a data objects partition 1126. The infrastructure objects partition 1122 includes an object-oriented software program component for the database server interface 1130, an object-oriented software program component for the system administrator interface 1132, and the operating system 1125. The operating system 1125 can be, for example, IBM AIX IBM OS/400, IBM OS/390, Microsoft Windows NT, Red Hat Linux, or Caldera Linux.

FIG. 11A-1 and 11A-2 show the presentation tier 1115 including a TCP/IP interface 1120 and a bank interface 1125. The presentation tier 1115 manages the graphical user interface with the user. A suitable implementation for the presentation tier 1115 is with Java servlets to interact with the user using the hypertext transfer protocol (HTTP). The Java servlets run within a request/response server, handling request messages from the user and returning response messages to the user. The Java servlet is a Java object that takes a request as input, parses its data, performs some logic, and then issues a response back to the user. The Java servlets are pooled and reused to service many user requests. The TCP/IP interface 1120, implemented with Java servlets, functions as a web server that communicates with the users using the HTTP protocol. The TCP/IP interface 1120 accepts HTTP requests from the user and passes the information in the request to the visit object 1128 in the business logic tier 1114. Result information returned from the business logic tier 1114 is passed by the visit object 1128 to the TCP/IP interface 1120, which sends the results back to the user in an HTTP response. The TCP/IP interface 1120 exchanges data through the TCI/IP network adapter 1106 of server 110 with the first and second users' computers 10 and 10'. Java servlets and the development of web site servers is described in the book by Duane K. Fields, et al. entitled "Web Development with Java Server Pages", published by Manning Publications Co., 2000.

The business logic tier 1114 in FIG. 11A-1 includes multiple instances of the visit object 1128, 1128', and 1128". Each user's computer 10 and 10' that sends a message to the server 110 has a temporary and separate visit object 1128 instantiated to represent the visit. The Enterprise Java Bean server can instantiate multiple copies of the visit object component 1128 in the business logic tier 1114 to handle multiple messages from multiple users. Each visit object 1128 will buffer user-specific information and maintain a user-specific state for the duration of the session with the user. Each visit object 1128 is a "stateful session bean" that will hold the conversational state about the user's visit. A stateful session bean is an Enterprise Java Bean that services business processes that span multiple method requests or transactions. The stateful session bean retains state on behalf of an individual user. Data received by the server from the user and data sent by the server to the user will be temporarily buffered in the visit object 1128. Each visit object 1128 receives from the interface 1120 the user data sent by the user's computer 10 or 10' to the server 110 in step 1101 of FIG. 11B. Each visit object 1128 will also buffer the resulting information that is computed by the server and is passed back to the TCP/IP interface 1120.

FIG. 11B shows the allocation of a given request by the visit object 1128 to the various application programs 1140 to 1148 in FIGS. 11A-1 and 11A-2, depending on the nature of the request to the server. The visit object method 1128 receives the user's request in step 1101 and determines in step 1103 whether so an interest-matching request. If so, then step 1105 sends a method call to the interest matching application 1140 in FIG. 11A-1. If not, then the method flows to step 1107. The visit object method 1128 determines in step 1107 whether the server has received a server control request. If so, then step 1109 sends a method call to the control program application 1142 in FIG. 11A-1. If not, then the method flows to step 1111. The visit object method 1128 determines in step 1111 whether the server has received an auction request. If so, then step 1113 sends a method call to the auction application 1144 in FIG. 11A-2. If not, then the method flows to step 1117. The visit object method 1128 determines in step 1117 whether the server has received a peer-to-peer mailbox request. If so, then step 1119 sends a method call to the mailbox/chatroom application 1146 in FIG. 11A-2. If not, then the method flows to step 1121. The visit object method 1128 determines in step 1121 whether the server has received a payment request. If so, then step 1121 sends a method call to the payment application 1148 in FIG. 11A-2. If not, then the method flows to step 1127, which sends the request to a parser for additional processing.

Figure 11C:
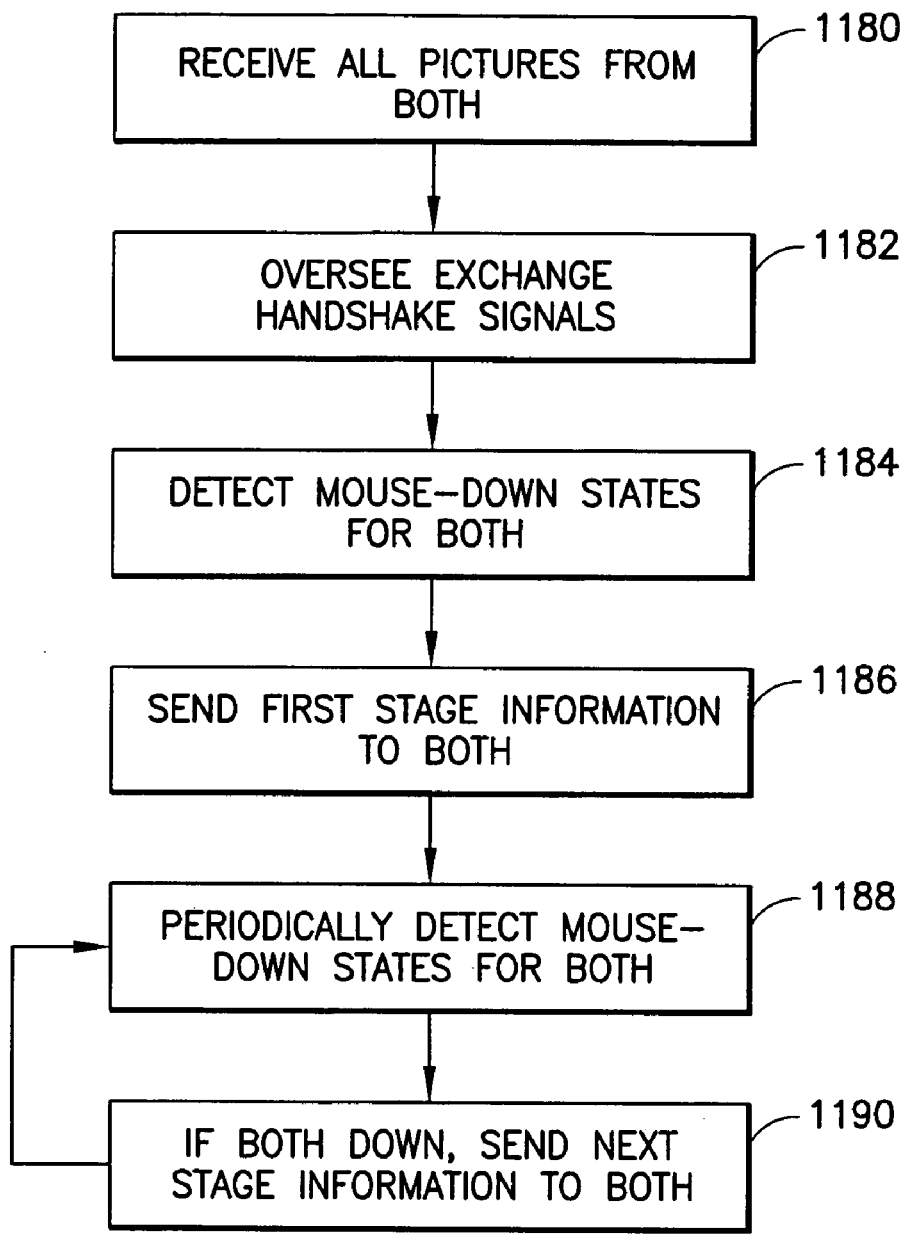
FIG. 11C is a flow diagram of the server control program application.

FIG. 11C shows the server control program 1142, which controls the progressive disclosure of information to both communicating users 10 and 10'. Step 1180 receives all of the pictures from both user computers, including each picture containing each stage of progressively greater resolution or detail. Then step 1182 oversees an exchange of handshake signals between the user computers, via the server 110. Then step 1184 detects the mouse-down states for both user computers 10 and 10'. Then step 1186 sends the first stage information to both user computers 10 and 10'. Then step 1188 periodically detects the continued mouse-down states for both user computers and, if both are down, then step 1190 sends the next stage information to both user computers and loops back to step 1188.

Figure 12:
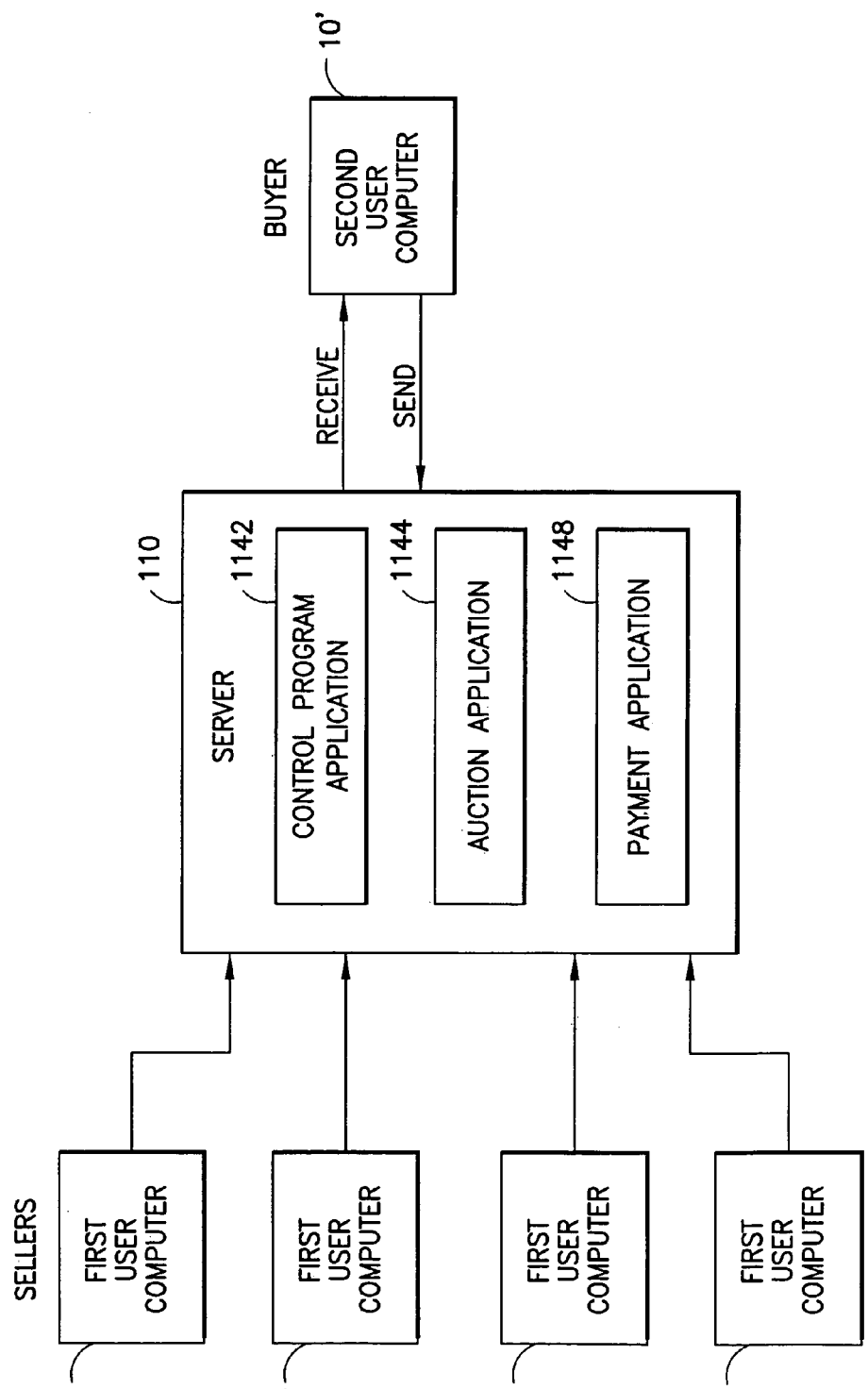
FIG. 12 is an alternative application of information collection from a plurality of first user computers and disclosure to a second user computer, for example, in an auction.

FIG. 12 shows a multiple user auction application 1144 in the server 110. A number of first user computers 10a, 10b, 10c, and 10d, and a second user computer 10' are connected to server 110. The auction application 1144 involves the same steps of information disclosure as detailed in the figures above, but involves one or more first user computers 10a, 10b, 10c, and 10d, inputting individual initial information to the server 110. In the auction application 1144, numerous sellers offer products to a buyer. Alternatively, a seller can offer information on numerous products of which the buyer can compare product information. The information is then available through the auction application 1144 in the server 110 to the second user computer 10'.

Figure 13:
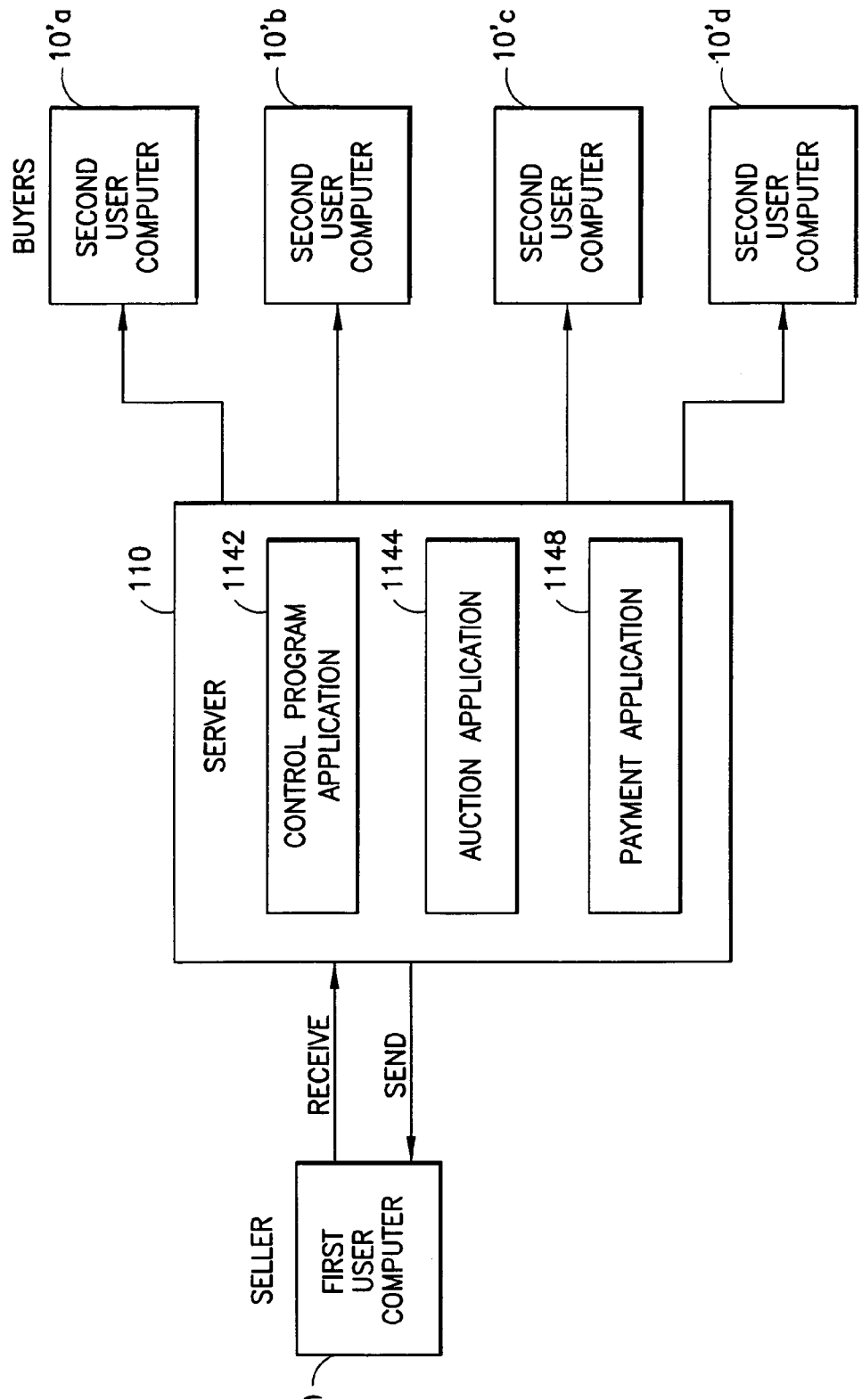
FIG. 13 is an alternative application of information collection from a first user computer and disclosure to a plurality of second user computers, for example, in an auction.

Alternatively, FIG. 13 shows an auction application 1144 involving a first user computer 10 connected to the server 110 and numerous second user computers 10'a, 10'b, 10'c, and 10'd, providing information for the first user computer 10. This auction could be used in a bidding application where one seller provides information and multiple prospective buyers bid on the item. The auction application 1144 makes use of the client interest matching application 1140, to facilitate matching buyers and sellers.

While various embodiments of the present invention have been described above, it should be understood that they have been presented by way of example, and not limitation. It will be apparent to persons skilled in the relevant art that various changes in form and detail can be placed therein without departing from the spirit and scope of the invention. Thus, the present invention should not be limited by any of the above-described example embodiments, but should be defined only in accordance with the following claims and their equivalents.

We claim:

1. A system comprising:
   a first computer which includes a first mouse, said first mouse including a first button; and
   a second computer in communication with said first computer; said second computer including a second mouse, said second mouse including a second button;
   said first computer operative to generate a sequence of first information which includes a first plurality of levels of information;
   said second computer operative to generate a sequence of second information which includes a second plurality of levels of information;
   said system operative to present a first one of said second plurality of levels of information to a first user via said first computer at a time when said first button and said second button are both activated;
   said system operative to present a first one of said first plurality of levels of information to a second user via said second computer at said time when said first button and said second button are both activated;

said system continuing to present additional ones of said second plurality of levels of information to said first user via said first computer and to present additional ones of said first plurality of levels of information to said second user via said second computer, only so long as said first button and said second button both remain activated.

2. The system of claim 1, wherein:

said first computer provides an indication to said second computer that said first button is activated; and said second computer provides an indication to said first computer that said second button is activated.

3. The system of claim 1, further comprising:

a server in communication with said first and second computers to relay information between said first and second computers.

4. The system of claim 1, wherein:

said sequence of first information includes a first series of images of increasing resolution; and said sequence of second information includes a second series of images of increasing resolution.

5. The system of claim 1, wherein:

said first plurality of levels of information includes levels of personal information concerning said first user; and said second plurality of levels of information includes levels of personal information concerning said second user.

6. The system of claim 1, wherein:

said first plurality of levels of information includes levels of employment qualifications of said first user; and said second plurality of levels of information includes levels of job description information of an employer of said second user.

* * * * *